(12) United States Patent
Kawashima et al.

(10) Patent No.: US 9,195,101 B2
(45) Date of Patent: Nov. 24, 2015

(54) LIQUID CRYSTAL DISPLAY PANEL COMPRISING A PIXEL ELECTRODE THAT INCLUDES ONE UNIFORMLY PLANAR ELECTRODE REGION AND ONE OR MORE FINELY PATTERNED ELECTRODE REGIONS

(71) Applicant: Sharp Kabushiki Kaisha, Osaka (JP)

(72) Inventors: Yuki Kawashima, Osaka (JP); Yasutoshi Tasaka, Osaka (JP); Keiichi Ina, Osaka (JP); Yoshimizu Moriya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/382,754

(22) PCT Filed: Mar. 1, 2013

(86) PCT No.: PCT/JP2013/055638
§ 371 (c)(1),
(2) Date: Sep. 3, 2014

(87) PCT Pub. No.: WO2013/133154
PCT Pub. Date: Sep. 12, 2013

(65) Prior Publication Data
US 2015/0022771 A1    Jan. 22, 2015

(30) Foreign Application Priority Data
Mar. 8, 2012   (JP) .................................. 2012-052269

(51) Int. Cl.
*G02F 1/1343* (2006.01)
*G02F 1/1337* (2006.01)

(52) U.S. Cl.
CPC .... *G02F 1/134336* (2013.01); *G02F 1/133707* (2013.01); *G02F 1/134309* (2013.01); *G02F 2001/134345* (2013.01)

(58) Field of Classification Search
USPC .................................................. 349/142–143
See application file for complete search history.

(56) References Cited

U.S. PATENT DOCUMENTS

| 2004/0233360 | A1  | 11/2004 | Yoshida et al. |
| 2006/0146243 | A1  | 7/2006  | Nakanishi et al. |
| 2007/0115409 | A1  | 5/2007  | Oka et al. |
| 2007/0285608 | A1* | 12/2007 | Fan ...................... G02F 1/13394 349/155 |
| 2009/0073367 | A1* | 3/2009  | Woo .................. G02F 1/133707 349/142 |

FOREIGN PATENT DOCUMENTS

| JP | 2004-302195 A | 10/2004 |
| JP | 2006-189610 A | 7/2006  |
| JP | 2007-94255 A  | 4/2007  |
| JP | 2007-140089 A | 6/2007  |
| JP | 2007-206346 A | 8/2007  |
| JP | 2011-85738 A  | 4/2011  |

\* cited by examiner

*Primary Examiner* — Paul Lee
(74) *Attorney, Agent, or Firm* — Chen Yoshimura LLP

(57) ABSTRACT

Each of the pixel electrodes that are disposed in a liquid crystal display panel of one embodiment of the present invention is constituted of minutely patterned electrode regions (a first minutely patterned electrode region and a second minutely patterned electrode region), and one solid electrode region, and the length Lpix of each of the pixel electrodes in a direction along a data line, and the total length LB of the minutely patterned electrode regions satisfies the relationship of LB/Lpix=0.3 to 0.6.

8 Claims, 17 Drawing Sheets

FIG. 4

|  | Gradation | Response Time (Milliseconds) | | |
|---|---|---|---|---|
|  |  | Present Embodiment | Comparison Example 1 | Comparison Example 2 |
| Rise⇔V0 | 32 | 143.3 | 158.6 | 133.2 |
|  | 64 | 92.4 | 120.6 | 100.8 |
|  | 128 | 47.4 | 57.5 | 49.2 |
|  | 192 | 33.3 | 34.6 | 34.3 |
|  | 255 | 11.6 | 12.6 | 12.7 |
| Fall⇔V0 | 32 | 7.1 | 11.4 | 11.4 |
|  | 64 | 5.7 | 8.6 | 7.4 |
|  | 128 | 6.0 | 8.9 | 7.9 |
|  | 192 | 6.0 | 8.6 | 6.9 |
|  | 255 | 6.5 | 7.7 | 9.4 |

FIG. 5

|  | Restoring Period (Seconds) | | |
|---|---|---|---|
|  | Present Embodiment | Comparison Example 1 | Comparison Example 2 |
| Residual Image | None | 0.5 | 0.5 |
| Pressure Mark | 2~3 | 4~5 | 4 |

|  | Present Embodiment | Comparison Example 1 | Comparison Example 2 |
|---|---|---|---|
| Transmittance Ratio | 0.995 | 1.0 | 0.982 |

FIG. 10

|  | Gradation | Response Time (Milliseconds) | | |
| --- | --- | --- | --- | --- |
|  |  | Present Embodiment | Comparison Example 1 | Comparison Example 2 |
| Rise⇔V0 | 32 | 133.2 | 158.6 | 92.7 |
|  | 64 | 86.6 | 120.6 | 118.9 |
|  | 128 | 50.2 | 57.5 | 59.6 |
|  | 192 | 28.4 | 34.6 | 37.0 |
|  | 255 | 18.3 | 12.6 | 15.2 |
| Fall⇔V0 | 32 | 6.6 | 11.4 | 7.5 |
|  | 64 | 6.0 | 8.6 | 7.3 |
|  | 128 | 6.3 | 8.9 | 7.5 |
|  | 192 | 6.4 | 8.6 | 9.2 |
|  | 255 | 7.5 | 7.7 | 7.8 |

FIG. 11

|  | Restoring Period (Seconds) | | |
| --- | --- | --- | --- |
|  | Present Embodiment | Comparison Example 1 | Comparison Example 2 |
| Residual Image |  | 0.5 | 2.0 |
| Pressure Mark | 2~3 | 4~5 | 4~5 |

Comparison Panel 1

Comparison Panel 2

| | Present Embodiment | Comparison Example 1 | Comparison Example 2 |
|---|---|---|---|
| Transmittance Ratio | 0.967 | 1.0 | 0.944 |

(a)

(b)

LIQUID CRYSTAL DISPLAY PANEL COMPRISING A PIXEL ELECTRODE THAT INCLUDES ONE UNIFORMLY PLANAR ELECTRODE REGION AND ONE OR MORE FINELY PATTERNED ELECTRODE REGIONS

TECHNICAL FIELD

The present invention relates to a liquid crystal display panel including pixel electrodes having a minutely patterned region.

BACKGROUND ART

Conventionally, liquid crystal display panels having a liquid crystal layer sandwiched between an upper substrate and a lower substrate are known as display panels used in mobile phones and the like. Among these, liquid crystal display panels using vertical alignment type liquid crystal as the liquid crystal layer (VA mode) are known for having a wide viewing angle. Also, in the vertical alignment type liquid crystal display panel, a method of performing orientation control of liquid crystal is proposed in which a plurality of electrode units smaller than one pixel are provided in each pixel, one pixel being constituted of these electrode units as pixel electrodes.

FIG. 20 shows a pixel structure in a liquid crystal display device disclosed in Patent Document 1, and shows a method of performing orientation control of liquid crystal, for example. FIG. 20(a) is a magnified plan view and FIG. 20(b) is a magnified cross-sectional view. FIG. 20(a) is a plan view showing a pixel structure, and shows the overlap of constituent elements of an element substrate 110 and an opposite substrate 120.

As shown in FIG. 20(a), the liquid crystal device 100 includes a pixel Px constituted of a plurality of pixels D1, D2, and D3 forming one group. The respective pixels D1, D2, and D3 include a pixel electrode 115, and one colored layer of one of the three primary colors (RGB) is provided for each of the three pixels D1, D2, and D3. Therefore, the respective pixels D1, D2, and D3 are respectively a red pixel D1, a green pixel D2, and a blue pixel D3. As shown in FIG. 20(a), in each of the pixels D1, D2, and D3, the pixel electrode 115 is constituted of island-shaped sub-pixel electrodes 115a, 115b, and 115c that are separated from each other. In the sub-pixel electrode 115a, the electrode radiates out from the center, and a plurality of fine cutouts 133 are formed in the periphery of the sub-pixel electrode. Also, in the sub-pixel electrodes 115b and 115c, cutouts 132 that are cut out from a portion of the pixel electrode 115 to separate the pixel electrode 115 into sub-pixel electrodes are formed. By forming the cutouts 132 to separate the pixel electrode 115 into such sub-pixel electrodes, the pixel electrode 115 is formed into separate substantially rectangular sub-pixel electrodes 115b and 115c. In the respective pixels D1, D2, and D3, the respective sub-pixel electrodes 115a, 115b, and 115c are connected to a connecting portion 159 so as to be at the same potential.

As shown in FIG. 20(b), colored layers 122R, 122B, and 122G are provided on an inner side of a main substrate body 120A of the opposite substrate 120 (portion of the main substrate body 120A facing the liquid crystal layer). Also, the peripheries of the respective colored layers are surrounded by a black matrix BM, and the black matrix BM forms the boundaries between the respective pixels D1, D2, and D3 (refer to FIG. 20(a)). On the surface of the colored layers 122R, 122B, and 122G, a common electrode 109 is formed on the entire surface of the opposite substrate 120, and on the inner side of the common electrode 109, protrusions 124 are formed as a way to perform orientation control. These protrusions 124 face substantially the respective centers of the sub-pixel electrodes, and as a result, with the liquid crystal molecules being vertically aligned in an initial state, the inclined surface of the protrusions 124 provides the liquid crystal molecules with a pretilt. As a result, it is possible to control or restrict the direction in which the liquid crystal molecules are inclined, and the liquid crystal molecules are inclined in eight directions from the protrusion 124 when a voltage is applied thereto. In other words, the liquid crystal device 100 has the orientation of the liquid crystal divided among the sub-pixel electrodes 115a, 115b, and 115c in the pixels D1, D2, and D3.

FIG. 21 shows a pixel structure of a liquid crystal display device disclosed in Patent Document 2, and a pixel electrode 220 formed in a pixel area surrounded by gate bus lines 214 and drain bus lines 216 has a plurality of electrode units 240 that have a square outer shaped and that are formed to be smaller than the pixel area, slits 242 of the electrodes formed between adjacent electrode units 240, and connecting electrodes 244 that electrically connect electrode units 240 separated by the slits 242. Each electrode unit 240 has a solid portion 246, and a plurality of trunk portions 248 and branch portions 250 that extend outward in the circumferential direction of the electrode unit 240 from the solid portion 246. Also, as shown in FIG. 21, protruding structures 264 similar to the protrusions 224 shown in FIG. 20(b) are provided in positions facing the solid portions 246 of the respective electrode units 240.

RELATED ART DOCUMENTS

Patent Documents

Patent Document 1: Japanese Patent Application Laid-Open Publication, "Japanese Patent Application Laid-Open Publication No. 2007-94255 (Published on Apr. 12, 2007)"

Patent Document 2: Japanese Patent Application Laid-Open Publication, "Japanese Translation of PCT International Application No. 2004-302195 (Published on Oct. 28, 2004)"

SUMMARY OF THE INVENTION

Problems to be Solved by the Invention

However, it is difficult to form sub-pixel structures as in Patent Documents 1 and 2 when the pixel pitch is relatively small, but if the pixel electrodes are formed as a monodomain and the monodomain electrode shape is made fully solid or the entire electrode has a detailed pattern, then the ability to orient the liquid crystal diminishes and display anomalies such as residual images or a decrease in aperture ratio occur.

Also, according to the configurations of Patent Documents 1 and 2, one pixel electrode includes a plurality of electrode units, and performs orientation control on the liquid crystal, and thus, the electrode units are connected to each other across one slit (cutout). Thus, as a result of the slit being large, the aperture ratio decreases.

Means for Solving the Problems

The present invention takes into consideration the above-mentioned problems, and an object thereof is to provide a liquid crystal display panel by which it is possible to attain high display quality while mitigating a decrease in aperture ratio.

In order to solve the above-mentioned problem, a liquid crystal display panel of the present invention includes: an element substrate on which a plurality of data wiring lines and a plurality of scan wiring lines that are perpendicular to each other are provided, a switching element being provided at intersections therebetween, one pixel electrode be provided for each sub-pixel defined by adjacent two data wiring lines and adjacent two scan wiring lines perpendicular thereto; an opposite substrate that faces the element substrate; and a liquid crystal layer sandwiched between the element substrate and the opposite substrate, wherein the one pixel electrode includes one uniformly planar electrode region, and one or more finely patterned electrode regions adjacent to the one uniformly planar electrode region in a direction along the data wiring lines, the finely patterned electrode regions having a pattern finer than the uniformly planar electrode region, wherein a portion that branches out from a plurality of locations of the one uniformly planar electrode region is provided in each of the one or more of the finely patterned electrode regions, and wherein a relational formula LB/Lpix=0.3 to 0.6 is satisfied, where Lpix is a length of the one pixel electrode in a direction parallel to the data wiring lines, and where LB is a total length of the one or more of the finely patterned electrode regions in the direction parallel to the data wiring lines.

Effects of the Invention

By the present invention, it is possible to provide a liquid crystal display panel that attains high display quality while mitigating a decrease in aperture ratio.

BRIEF DESCRIPTION OF THE DRAWINGS

FIG. 4 shows a comparison between characteristics of the liquid crystal display panel shown in FIG. 1 and comparison examples.

FIG. 5 shows a comparison between characteristics of the liquid crystal display panel shown in FIG. 1 and comparison examples.

FIG. 10 shows a comparison between characteristics of the liquid crystal display panel shown in FIG. 1 and comparison examples.

FIG. 11 shows a comparison between characteristics of the liquid crystal display panel shown in FIG. 9 and comparison examples.

DETAILED DESCRIPTION OF EMBODIMENTS

Embodiment 1

An embodiment of a liquid crystal display panel according to the present invention will be described with reference to FIGS. 1 to 7.

(Schematic Configuration of Liquid Crystal Display Panel)

Figure 1:
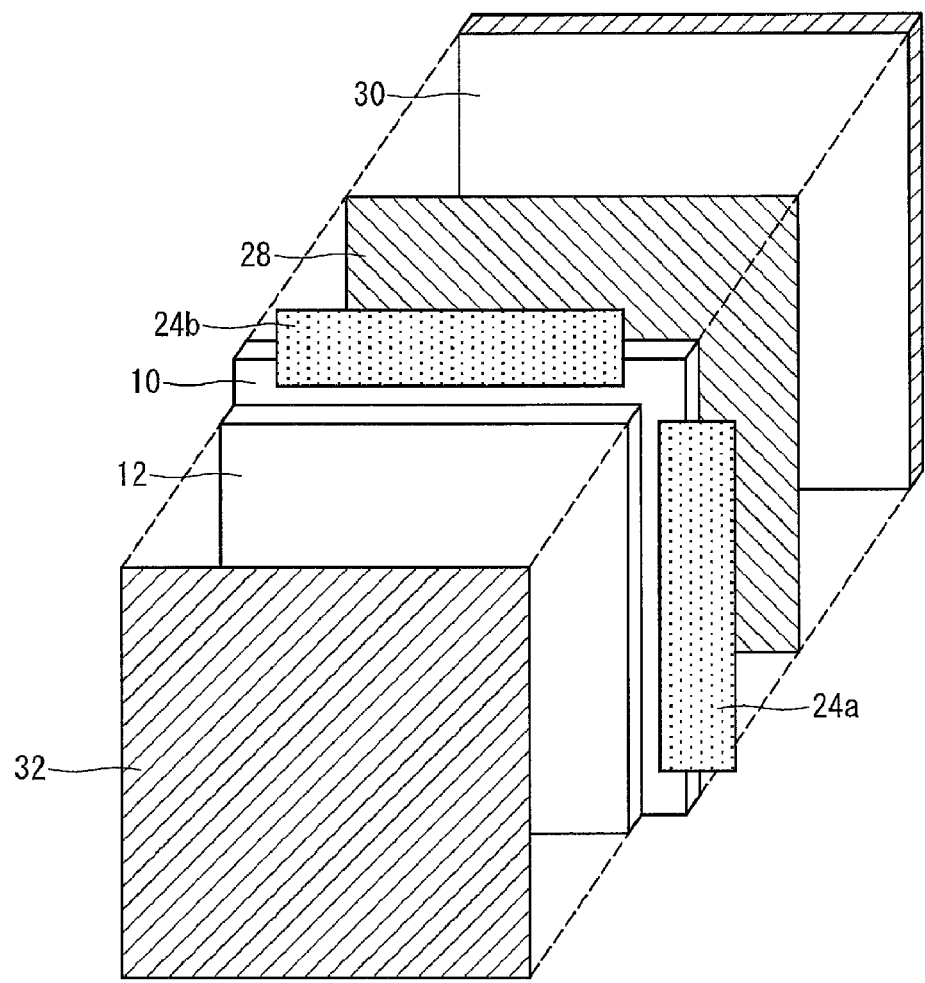
FIG. 1 is a diagram showing a configuration of one embodiment of a liquid crystal panel of the present invention.

FIG. 1 shows a schematic configuration of a liquid crystal display panel of the present embodiment. The liquid crystal display panel of the present embodiment has a structure in which a TFT substrate 10 (element substrate) on which TFTs (thin film transistors) and the like are formed and a CF substrate 12 (opposite substrate) on which CFs (color filters) and the like are formed are bonded together, and a liquid crystal layer is formed by sealing liquid crystal between the two substrates 10 and 12.

Figure 2:
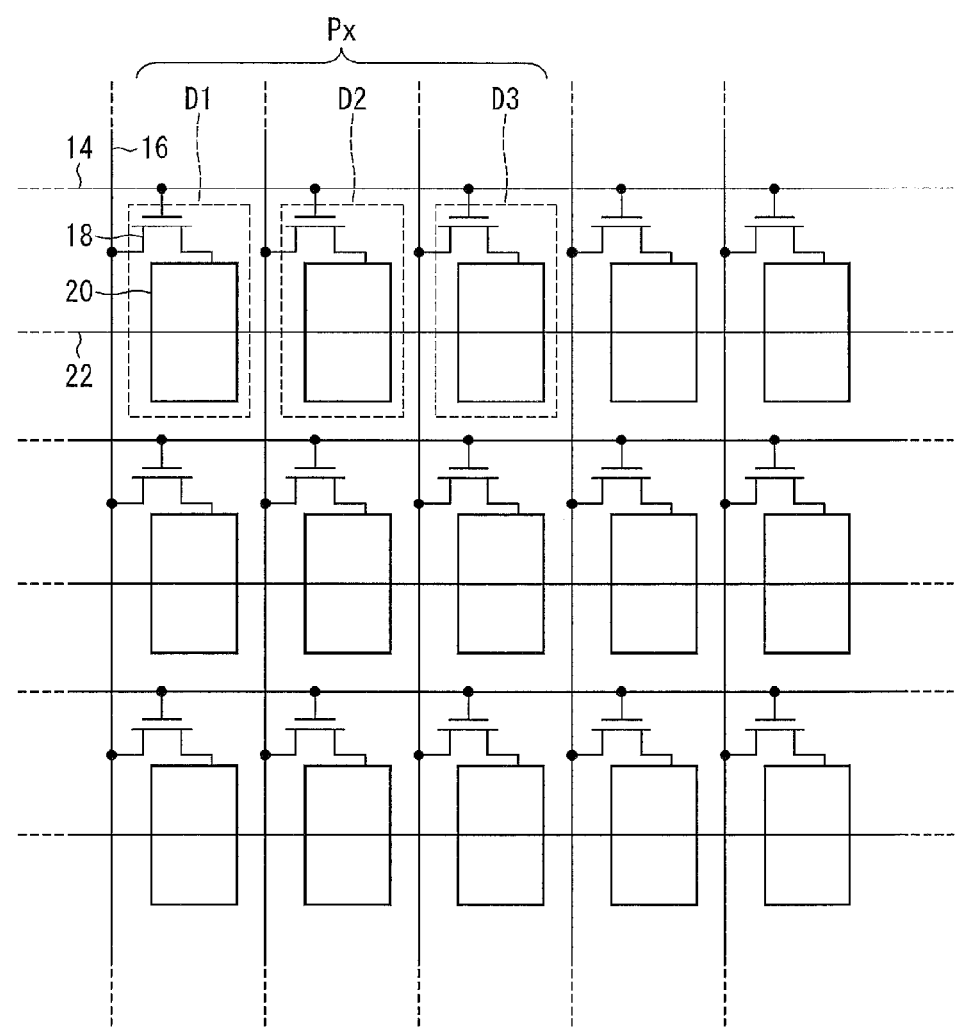
FIG. 2 shows an equivalent circuit of a TFT substrate included in the liquid crystal display panel.

FIG. 2 schematically shows an equivalent circuit of elements formed on the TFT substrate 10. On the TFT substrate 10, a plurality of scan wiring lines 14 that are parallel to each other and that extend in the left-and-right direction in the drawing are formed. A plurality of data wiring lines 16 that intersect with the scan wiring lines 14 across an insulating film, that are parallel to each other, and that extend in the up-and-down direction in the drawing are formed. The respective regions surrounded by the plurality of scan wiring lines 14 and data wiring lines 16 are pixel areas (sub-pixels). The respective pixel areas arranged in a matrix have formed therein a TFT 18, and a pixel electrode 20 made of a transparent conductive film such as ITO (indium tin oxide), for example. The source electrode of each TFT 18 is connected to an adjacent data wiring line 16, the gate electrode is connected to an adjacent scan wiring line 14, and the source electrode is connected to the pixel electrode 20. In approximately the center of each pixel area (each pixel electrode 20) a storage capacitance bus line 22 that is parallel to the scan wiring lines 14 is formed.

Additionally, as shown in FIG. 1, a scan wiring line driver circuit 24a on which a driver IC (integrated circuit) that drives the plurality of scan wiring lines 14 is mounted, and a data wiring line driver circuit 24b on which a driver IC that drives the plurality of data wiring line 16 is mounted are provided on the TFT substrate 10. The scan wiring line driver circuit 24a outputs to prescribed scan wiring lines 14 a scan signal based on a prescribed signal outputted from a control circuit that is not shown, and the data wiring line driver circuit 24b outputs to prescribed data wiring lines 16 a data signal based on a prescribed signal outputted from the control circuit that is not shown. The TFTs 18 are turned ON/OFF by the scan signal supplied from the scan wiring lines 14, and when the TFTs 18 are ON, a display signal is supplied to the pixel electrodes 20 from the data wiring lines 16.

A polarizing plate 28 is disposed on a surface of the TFT substrate 10 opposite to the surface on which elements are formed, and a backlight unit 30 is attached to a surface of the polarizing plate 28 opposite to the surface thereof attached to the TFT substrate 10.

On the other hand, as shown in FIG. 1, a polarizing plate 32 is attached to the surface of the CF substrate 12 opposite to the surface on which the CFs are formed. The polarizing plate 28 and the polarizing plate 32 are disposed in a crossed Nicols state, and trunk portions 20a-1 and 20c-1 (FIG. 3) provided in the pixel electrode 20 to be described later are arranged such that the polarizing axis (transmission axis) thereof coincides with that of either of the pair of polarizing plates.

Colored layers are provided on the inner side (liquid crystal layer side) of the main substrate body of the CF substrate 12. Also, the respective colored layers are surrounded by a black matrix made of metal such as chrome, and the boundaries of the pixel areas D1, D2, and D3 are defined by the black matrix.

On the surface of the colored layers, a common electrode made of a transparent conductive film such as ITO is formed on the entire surface of the CF substrate 12. In addition, the common electrode is provided with holes for orientation control. The holes will be described later. Also, an alignment film made of a resin such as polyimide or an inorganic material is formed so as to cover the surface of the common electrode. The alignment treatment has the function of a vertical alignment film that orients the liquid crystal molecules vertically with respect to the surface of the alignment film, and no alignment treatment such as rubbing is performed thereon.

The liquid crystal layer includes liquid crystal molecules having a negative permittivity. Although not shown, the liquid crystal layer is sandwiched by a pair of alignment films, and when a voltage is not being applied, the liquid crystal molecules have long axes thereof close to perpendicular with respect to the TFT substrate 10, and when a voltage is applied, the long axis thereof becomes closer to horizontal compared to when a voltage is not being applied. In the present embodiment, the azimuth of the directors of the liquid crystal molecules when a voltage is being applied is approximately 45° with respect to the polarizing axes of the pair of polarizing plates.

The liquid crystal display panel of the present embodiment having the above-mentioned configuration includes one pixel Px constituted of a group including the three pixel areas D1, D2, and D3. The respective pixel areas D1, D2, and D3 include the pixel electrodes 20, and one colored layer of one of the three primary colors (RGB) is provided for each pixel area. Thus, each of the pixel areas D1, D2, and D3 is a red pixel area D1, a green pixel area D2, and a blue pixel area D3.

(Structure of Pixel Electrode)

The characteristic of the present embodiment is in the structure of the pixel electrodes 20. The structure of the pixel electrodes 20 will be described with reference to FIG. 3, FIG. 3 being a plan view showing the pixel electrode 20 of one pixel area. For ease of description, in FIG. 3, only the pixel electrode 20, and the two scan wiring lines 14n and 14n+1 and the two data wiring lines 16m and 16m+1 that surround the pixel electrode 20 of one pixel area in a plan view will be described.

Figure 3:
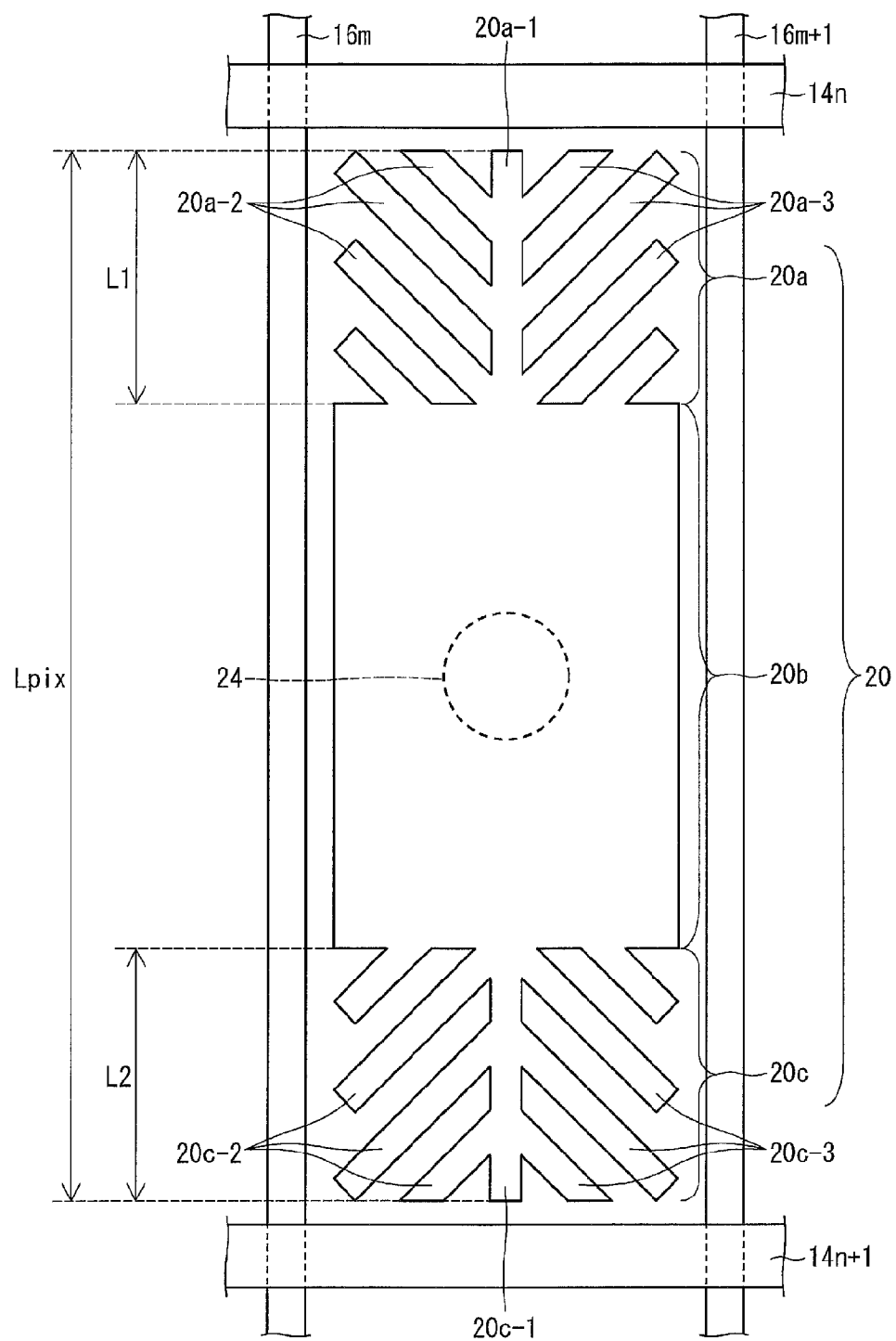
FIG. 3 is a plan view of a pixel electrode included in the liquid crystal display panel shown in FIG. 1.

In other words, as shown in FIG. 3, one pixel area is defined by the scan wiring line 14n, the scan wiring line 14n+1, the data wiring line 16m, and the data wiring line 16m+1. The pixel electrode 20 formed to substantially the same size as the one pixel area is configured such that a length Lpix in a direction parallel to the two data wiring lines 16 and 16m+1 is longer than the length in a direction parallel to the two scan wiring lines 14n and 14n+1.

One pixel electrode 20 is not divided into a plurality of subunits, but it is possible to conceptualize the structure (shape) as having three regions. Specifically, one pixel electrode 20 includes a first minutely patterned electrode region 20a that is close to one scan wiring line 14n that defines the pixel area where the pixel electrode 20 is formed, a second minutely patterned electrode region 20c that is close to the other scan wiring line 14n+1, and a solid electrode region 20b that is between the first minutely patterned electrode region 20a and the second minutely patterned electrode region 20c.

The first minutely patterned electrode region 20a, the solid electrode region 20b, and the second minutely patterned electrode region 20c are all equal in length in the direction parallel to the two data wiring lines 16m and 16m+1.

On the other hand, a characteristic of the present invention is that if the length of one pixel electrode 20 in the direction parallel to the data wiring lines is Lpix and the length of a minutely patterned electrode region in the direction parallel to the data wiring lines is LB, the following relational formula is satisfied: LB/Lpix=0.3 to 0.6. In the present embodiment, the minutely patterned electrode regions include the first minutely patterned electrode region 20a and the second minutely patterned electrode region 20c, and LB described above is equal to the sum of the respective lengths of the first minutely patterned electrode region 20a and the second minutely patterned electrode region 20c in the direction parallel to the data wiring lines.

In other words, as shown in FIG. 3, if the length of the first minutely patterned electrode region 20a in the direction parallel to the data wiring lines is L1, and the length of the second minutely patterned electrode region 20a in the direction parallel to the data wiring lines is L2, then the following relational formula of the relation with the length Lpix of one pixel electrode 20 in the direction parallel to the data wiring lines is satisfied: (L1+L2)/Lpix=0.3 to 0.6.

The structure of the first minutely patterned electrode region 20a and the second minutely patterned electrode region 20c will be described below.

As shown in FIG. 3, the first minutely patterned electrode region 20a and the second minutely patterned electrode region 20c are formed off of a pair of opposing sides of the overall rectangular solid electrode region 20b.

Specifically, the first minutely patterned electrode region 20a is formed off of one of the pair of opposing sides of the solid electrode region 20b, and has: (i) a trunk portion 20a-1 that is located substantially towards the center and that is parallel to the two data wiring lines 16m and 16m+1; (ii) a plurality of branch portions 20a-2 that are closer to one data wiring line 16m than the trunk portion 20a-1 and that extend towards the one data wiring line 16m; and (iii) a plurality of branch portions 20a-3 that are closer to one data wiring line 16m+1 than the trunk portion 20a-1 and that extend towards the one data wiring line 16m+1.

More specifically, the plurality of branch portions 20a-2 have a longer side direction that is inclined at approximately 45° in the counterclockwise direction on the page with the solid electrode region 20b as the center, with respect to the longer side direction of the trunk portion 20a-1, and the respective branch portions 20a-2 are parallel to each other and arranged at equal gaps therebetween. Some branch portions 20a-2 among the plurality of branch portions 20a-2 branch out from the trunk portion 20a-1, and the remaining branch portion 20a-2 branches out from the solid electrode region 20b.

More specifically, the plurality of branch portions 20a-3 have a longer side direction that is inclined at approximately 45° in the clockwise direction on the page with the solid electrode region 20b as the center, with respect to the longer side direction of the trunk portion 20a-1, and the respective branch portions 20a-3 are parallel to each other and arranged at equal gaps therebetween. Some branch portions 20a-3 among the plurality of branch portions 20a-3 branch out from the trunk portion 20a-1, and the remaining branch portion 20a-3 branches out from the solid electrode region 20b.

Next, similar to the first minutely patterned electrode region 20a, the second minutely patterned electrode region 20c specifically has: (iv) a trunk portion 20c-1 that is located substantially towards the center and that is parallel to the two data wiring lines 16m and 16m+1; (v) a plurality of branch portions 20c-2 that are closer to one data wiring line 16m than the trunk portion 20c-1 and that extend towards the one data wiring line 16m; and (vi) a plurality of branch portions 20c-3 that are closer to one data wiring line 16m+1 than the trunk portion 20c-1 and that extend towards the one data wiring line 16m+1.

More specifically, the plurality of branch portions 20c-2 have a longer side direction that is inclined at approximately 45° in the clockwise direction on the page with the solid electrode region 20b as the center, with respect to the longer side direction of the trunk portion 20c-1, and the respective branch portions 20c-2 are parallel to each other and arranged at equal gaps therebetween. Some of the branch portions 20c-2 among the plurality of branch portions 20c-2 branch out from the trunk portion 20c-1, with the remaining branch portion 20c-2 branching out from the solid electrode region 20b.

More specifically, the plurality of branch portions 20c-3 have a longer side direction that is inclined at approximately 45° in the counterclockwise direction on the page with the solid electrode region 20b as the center, with respect to the longer side direction of the trunk portion 20c-1, and the respective branch portions 20c-3 are parallel to each other and arranged at equal gaps therebetween. Some of the branch portions 20c-3 among the plurality of branch portions 20c-3 branch out from the trunk portion 20c-1, with the remaining branch portion 20c-3 branching out from the solid electrode region 20b.

In other words, the first minutely patterned electrode region 20a and the second minutely patterned electrode region 20c have a so-called fishbone pattern.

The first minutely patterned electrode region 20a is formed off of a plurality of locations on the solid electrode region 20b. In other words, in FIG. 3, the trunk portion 20a-1 and the four branch portions (branch portions 20a-2 and branch portions 20a-3) are formed off of the boundary between the solid electrode region 20b and the first minutely patterned electrode region 20a. The second minutely patterned electrode region 20c is also formed off of a plurality of locations on the solid electrode region 20b. In other words, in FIG. 3, the trunk portion 20c-1 and the four branch portions (branch portion 20c-2 and branch portion 20c-3) are at the boundary between the solid electrode region 20b and the second minutely patterned electrode region 20c.

The length L1 of the first minutely patterned electrode region 20a in the direction parallel to the data wiring lines is equal to the length from the tip of the trunk portion 20a-1 to the boundary between the solid electrode region 20b and the first minutely patterned electrode region 20a. The length L2 of the second minutely patterned electrode region 20c in the direction parallel to the data wiring lines is equal to the length from the tip of the trunk portion 20c-1 to the boundary between the solid electrode region 20b and the second minutely patterned electrode region 20c. The length Lpix of one pixel electrode 20 is the length from the tip of the trunk portion 20a-1 to the tip of the trunk portion 20c-1. The trunk portion 20a-1 and the trunk portion 20c-1 are arranged on the same line.

In the present embodiment, the length L1 of the first minutely patterned electrode region 20a in the direction parallel to the data wiring lines, and the length L2 of the second minutely patterned electrode region 20c in the direction parallel to the data wiring lines satisfy the following relation: L1=L2.

In this manner, the pixel electrode 20 of the present embodiment has boundaries between the solid electrode region 20b and the trunk portion 20a-1 and the trunk portion 20c-1, and has four domains: a domain where the plurality of branch portions 20a-2 are formed; a domain where the plurality of branch portions 20a-3 are formed; a domain where the plurality of branch portions 20c-2 are formed; and a domain where the plurality of branch portions 20c-3 are formed. In each domain, the azimuth direction of incline (azimuth component of long axis of liquid crystal molecules inclined as a result of the electric field) of the liquid crystal molecules is determined by the electric fields generated between adjacent branch portions. This azimuth direction is parallel to each branch portion. In the present embodiment, when voltage is being applied, the liquid crystal molecules have directors at an azimuth of approximately 45° with respect to the polarizing axis of the pair of polarizing plates, and the respective liquid crystal molecules face the four directions. Straight polarized light at 45° with respect to the polarizing axis is not absorbed by the polarizing plate, and thus, preferred transmittance is attained.

The width of the branch portions and the distance between adjacent branch portions may be appropriately decided within a range by which it is possible to perform desired orientation control.

(Hole for Orientation Control)

The holes provided in the common electrode of the CF substrate 12 are provided in positions corresponding to the centers of the solid electrode regions 20b (FIG. 3 shows an imaginary hole 24).

By having this hole 24, the electric field formed by the hole 24 when voltage is being applied causes the liquid crystal molecules of the liquid crystal layer, which has a vertical orientation in an initialized state (when no voltage is applied), to be inclined, and thus, the direction in which the liquid crystal molecules in the vicinity of the hole 24 incline can be controlled or restricted.

If, in the pixel area described above, a voltage is applied between the pixel electrode 20 and the common electrode, an electric field along the gaps between the branch portions is formed, and the liquid crystal molecules are oriented by the electric field. In other words, the gaps function as a way to perform orientation control on the liquid crystal molecules by controlling the electric field. On the other hand, the solid electrode region 20b is where the hole is disposed so as to face the solid electrode region 20b, and thus, the liquid crystal molecules are oriented by orientation control by the hole.

The excellent response characteristics of the liquid crystal display panel of the present embodiment will be described with reference to FIG. 4. FIG. 4 is a chart showing results of measured response times of the liquid crystal display panel of the present embodiment, and, as comparison examples, a comparison panel 1 that differs from the liquid crystal display panel of the present embodiment only in that the pixel electrodes thereof only include solid electrodes, and a comparison panel 2 that differs from the liquid crystal display panel of the present embodiment in that the ratio of the minutely patterned electrode portions of the pixel electrodes differs from that of the present embodiment. The comparison panel 2 is a panel in which the minutely patterned portions take up 76% of the entire pixel electrode. As shown in FIG. 4, it can be seen that in the liquid crystal display panel of the present embodiment (present embodiment in FIG. 4) the response time is much shorter than in the comparison panels (Comparison Examples 1 and 2 in FIG. 4). Thus, it can be said that the response characteristics are improved.

FIG. 5 shows the results of measurements of the liquid crystal display panel of the present embodiment, and the comparison panels 1 and 2 concerning the restoring period required for the residual image to disappear during display switching, and the restoring period required for the pressure marks to disappear. As shown in FIG. 5, in the liquid crystal display panel of the present embodiment, it is possible to reduce the restoring period required for the residual image to disappear during display switching and the restoring period required for the pressure marks to disappear. The restoring period required for the residual image to disappear is measured by measuring the time it takes from when switching begins to when the residual image disappears when switching from a black window being displayed with a white background to a solid white image. The time it takes for the pressure mark to disappear is measured by tracing the panel surface with a stick when displaying a solid white image and measuring the time required for the resulting pressure mark to disappear.

Figure 6:
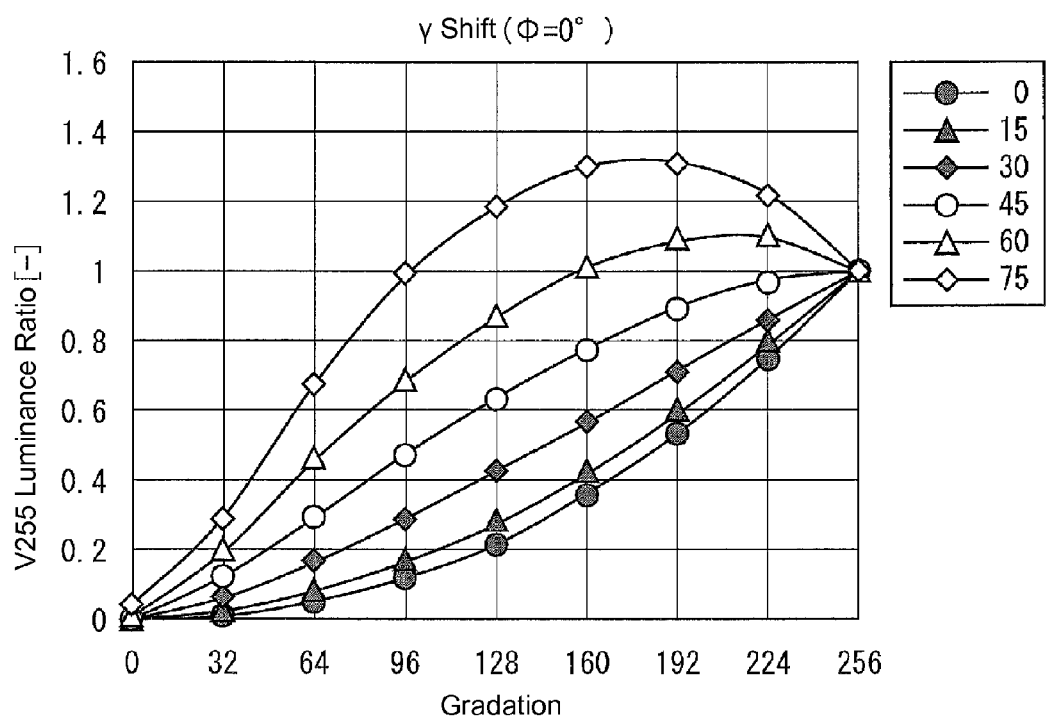
FIG. 6 shows characteristics of the liquid crystal display panel shown in FIG. 1.
Figure 7:
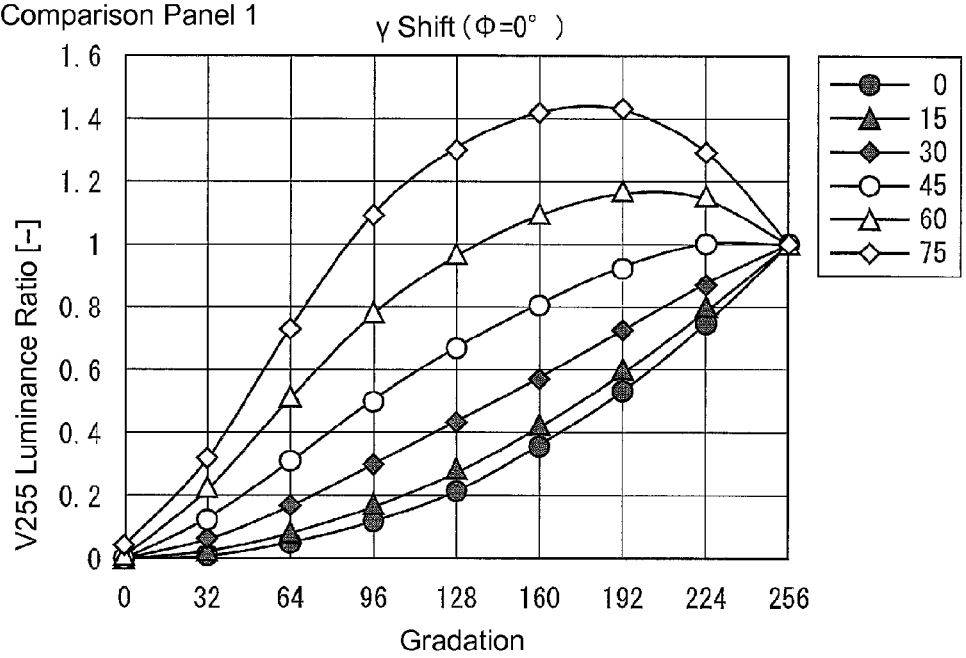
FIG. 7 shows characteristics of a liquid crystal display panel of comparison examples.
Figure 7:
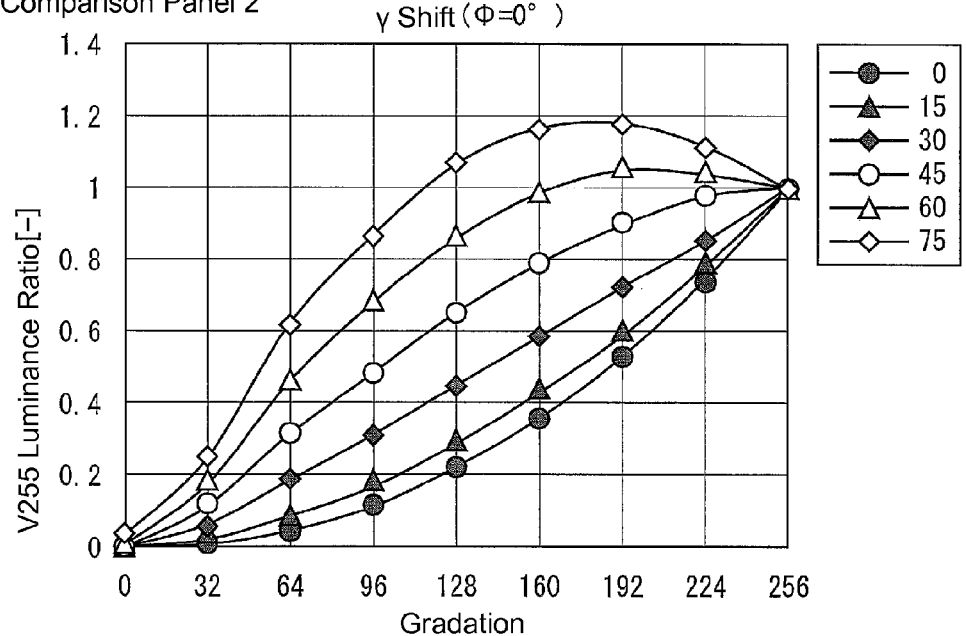

Next, alleviation of γ shift is described with reference to the liquid crystal display panel of the present embodiment and the comparison panels 1 and 2. FIG. 6 is a graph showing the γ shift of the liquid crystal display panel of the present embodiment, and FIG. 7 shows graphs of the γ shift in the comparison panels 1 and 2. In the respective graphs, the azimuth Φ=0, and the viewing angle θ is 0 to 75°. In the example graphs, as θ increases, the gradation-luminance characteristic (luminance ratio) curve shifts upward with respect to the gradation-luminance characteristic curve for when θ=0. The greater the shift upward is, the greater the γ shift is, but in the liquid crystal display panel of the present embodiment, the amount of shift upward is small compared to the comparison panels 1 and 2 shown in FIG. 7. In other words, with the configuration of the liquid crystal display panel of the present embodiment, the amount of shift can be reduced.

Figures 8, 9:
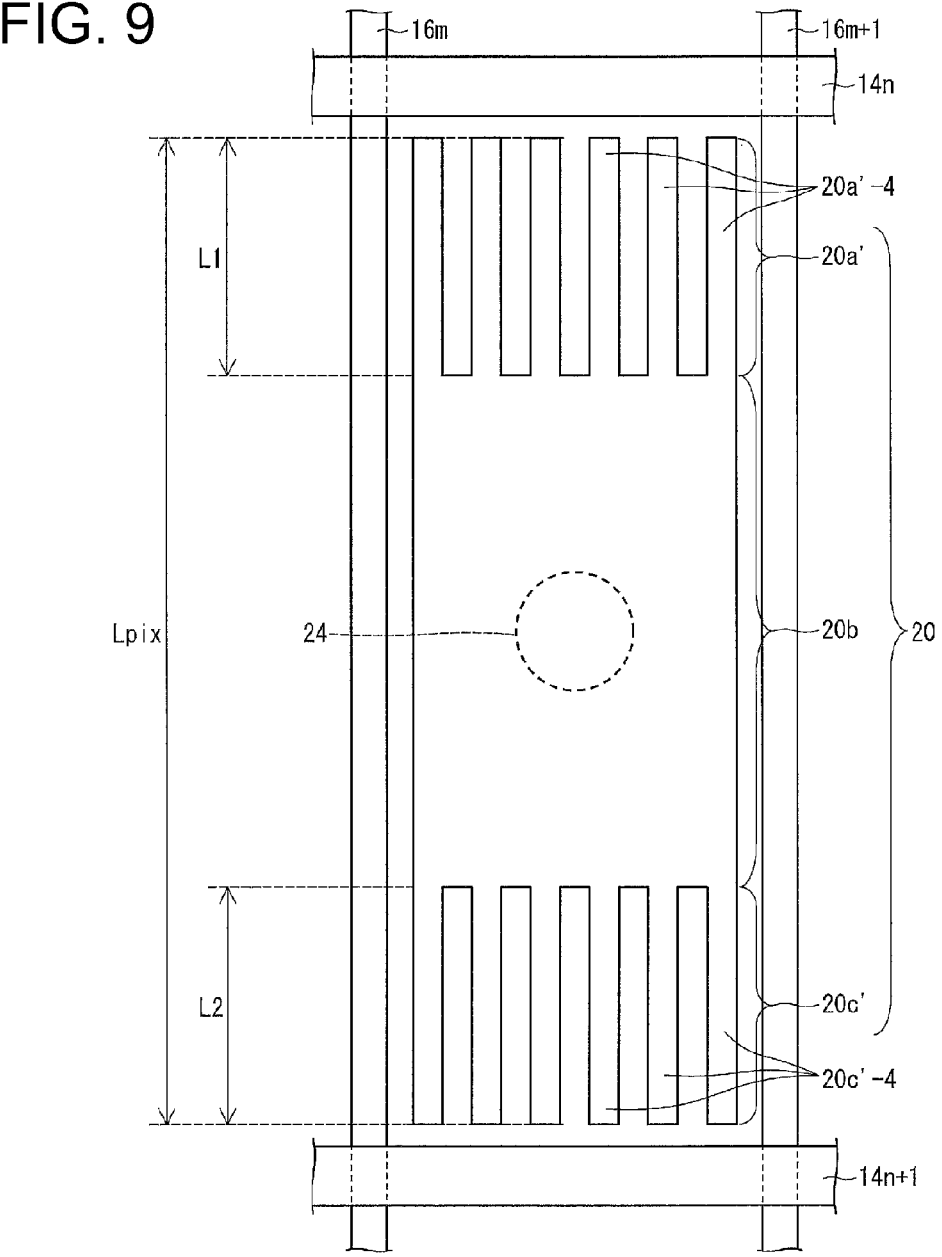
FIG. 8 shows characteristics of the liquid crystal display panel shown in FIG. 1.
FIG. 9 is a plan view of another embodiment of a pixel electrode included in the liquid crystal display panel shown in FIG. 1.

If the entire pixel electrode is made of a solid electrode, then there is a need to provide a relatively large orientation control body to control the orientation of the liquid crystal molecules, or to provide a plurality of orientation control bodies, which raises the concern of a decreased aperture ratio due to the orientation control bodies. On the other hand, minutely patterned electrode regions have gaps between electrodes which can cause dark lines to appear (portions with relatively low transmittance). Thus, if the entire pixel electrode has a minutely patterned structure, then there is a concern of decreased transmittance due to the decrease in actual voltage applied to the liquid crystal molecules. However, in the liquid crystal display panel of the present embodiment, the length L1 of the first minutely patterned electrode region 20a in the direction parallel to the data wiring lines, the length L2 of the second minutely patterned electrode region 20c in the direction parallel to the data wiring lines, and the length Lpix of one pixel electrode 20 in the direction parallel to the data wiring lines, all of which are shown in FIG. 3, satisfy the following relational formula: (L1+L2)/Lpix=0.3 to 0.6. In other words, the minutely patterned electrode regions take up a 30% to 60% of the total length of the pixel electrode 20 in the direction parallel to the data wiring lines. Thus, as shown in FIG. 8, panels that satisfy this range have an improved transmittance compared to a configuration in which the entire pixel electrode is a solid electrode (comparison panel 1) or a configuration in which the proportion that the minutely patterned electrode takes up is outside of this range (ratio of comparison panel 2:minutely patterned electrode is 76%).

(Effects of the Present Embodiment)

According to the present embodiment, one pixel electrode is constituted of one solid electrode region, and minutely patterned electrode regions adjacent to the solid electrode region along the data wiring lines. By providing the minutely patterned electrode regions, the response characteristics can be improved. On the other hand, as described above, if the proportion taken up in the one pixel electrode by the minutely patterned electrode region is too small, then the response characteristics cannot be improved sufficiently, and the time required for residual images to disappear during display switching, and the time required for pressure marks to disappear become long. According to the present embodiment, the minutely patterned electrode regions take up 30% to 60% of the total length of one pixel electrode in the direction parallel to the data wiring lines. In other words, the minutely patterned electrode regions take up at least 30% of the total length of the one pixel electrode in the direction parallel to the data wiring lines. As a result, it is possible to improve the response characteristics sufficiently, and it is possible to shorten the time required for the residual images to disappear during display switching, and the time required for pressure marks to disappear.

On the other hand, as described above, if the proportion of the one pixel electrode taken up by the minutely patterned electrode regions is too large, then a decrease in transmittance is a concern. In the liquid crystal display panel of the present invention, the length of the minutely patterned electrode region in the direction parallel to the data wiring lines does not exceed 60% of the length of one pixel electrode. As a result, it is possible to mitigate a decrease in transmittance.

According to the present embodiment, as shown in FIG. 3, the respective minutely patterned electrode regions have portions that branch out from a plurality of locations of one solid electrode region. In other words, this is not a configuration in which a slit is provided between the solid electrode region and the minutely patterned electrode region with the respective regions being connected by one connecting portion. Thus, compared to a conventional configuration in which a large slit reduces the aperture ratio, it is possible to mitigate a decrease in aperture ratio.

Because the length L1 of the first minutely patterned electrode region 20a in the direction parallel to the data wiring lines is equal to the length L2 of the second minutely patterned electrode region 20c in the direction parallel to the data wiring lines (L1=L2), it is possible to mitigate changes in potential in the pixel electrodes resulting from changes in potential in the scan wiring lines.

Modification Example

Protrusion for Orientation Control

In the present embodiment, a configuration was described in which holes 24 (FIG. 3) for orientation control are formed in the common electrode, but the present invention is not limited thereto, and protrusions (orientation control structures) may be provided on the inner side (liquid crystal layer side) of the common electrode instead of the holes. The protrusion is provided on positions of the common electrode provided on the CF substrate 12 corresponding to the centers of the solid electrode regions 20b. In other words, each protrusion can be provided in the same position as the hole 24 in FIG. 3.

The protrusions are formed simultaneously on the common electrode at the same height from the common electrode in the pixel areas D1, D2, and D3. The protrusions can be formed of a resin material made of an organic film such as an acrylic resin, and are provided so as to protrude from the CF substrate 12 towards the liquid crystal layer. The protrusion has a circular shape in a plan view as shown in FIG. 3, but can have a triangular shape with a vertex towards the liquid crystal layer in a side view. In other words, the protrusion can be provided with a conical shape on the common electrode.

By providing the protrusions, the liquid crystal molecules are vertically oriented against the inclined surface of the protrusion to control the azimuth angle of orientation of the surrounding liquid crystal molecules when the liquid crystal molecules of the liquid crystal layer are in an initial state (when no voltage is being applied).

If, in the pixel area described above, a voltage is applied between the pixel electrode 20 and the common electrode, an electric field along the gaps between the branch portions is formed, and the liquid crystal molecules are oriented by the electric field. In other words, this gap functions as a way to perform orientation control on the liquid crystal molecules by controlling the electric field. On the other hand, the solid electrode region 20b is where the protrusion is disposed so as to face the solid electrode region 20b, and thus, the liquid crystal molecules are oriented by orientation control by the protrusion.

Embodiment 2

Another embodiment of the liquid crystal display panel of the present invention will be described with reference to FIGS. 9 and 10. In the present embodiment, in order to describe differences with Embodiment 1, for ease of description, members having the same functions as the members described in Embodiment 1 are assigned the same reference characters, and descriptions thereof will be omitted.

The difference between Embodiment 1 and the present embodiment is in the structure of the pixel electrode. The structure of the pixel electrode of the present embodiment will be described with reference to FIG. 9. FIG. 9 is a drawing that corresponds to FIG. 3 of Embodiment 1.

The pixel electrode 20 included in the liquid crystal display panel of Embodiment 1 has minutely patterned electrode regions having a so-called fishbone structure as shown in FIG. 3. By contrast, as shown in FIG. 9, a pixel electrode 20' included in the liquid crystal display panel of the present embodiment has a first minutely patterned electrode region 20a' and a second minutely patterned electrode region 20c' that are constituted of a plurality of branch portions 20a'-4 and 20c'-4 that extend in a direction parallel to the data wiring lines from a respective pair of opposing sides of an overall rectangular solid electrode region 20b.

The plurality of branch portions 20a'-4 constituting the first minutely patterned electrode region 20a' are parallel to each other and disposed at equal gaps from each other, and the plurality of branch portions 20c'-4 constituting the second minutely patterned electrode region 20c' are also parallel to each other and disposed at equal gaps from each other. The width of each branch portion and the distance between adjacent branch portions may be appropriately determined within a range that allows desired orientation control.

Also, as shown in FIG. 9, the length L1 of the first minutely patterned electrode region 20a' in the direction parallel to the data wiring lines, the length L2 of the second minutely patterned electrode region 20c' in the direction parallel to the data wiring lines, and the length Lpix of one pixel electrode 20' in the direction parallel to the data wiring lines satisfy the following relational formula: $(L1+L2)/Lpix=0.3$ to $0.6$.

The first minutely patterned electrode region 20a' and the second minutely patterned electrode region 20c' are formed off of the solid electrode region 20b from a plurality of locations. The length L1 of the first minutely patterned electrode region 20a' in the direction parallel to the data wiring lines is equal to the length from the tips of the plurality of branch portions 20a'-4 to the boundary between the solid electrode region 20b and the first minutely patterned electrode region 20a'. Also, the length L2 of the second minutely patterned electrode region 20c' in the direction parallel to the data wiring lines is equal to the length from the tips of the plurality of branch portions 20c'-4 to the boundary between the solid electrode region 20b and the second minutely patterned electrode region 20c'. Also, the length Lpix of one pixel electrode 20 is measured from the tips of the plurality of branch portions 20a'-4 to the tips of the plurality of branch portions 20c'-4.

The excellent response characteristics of the liquid crystal display panel of the present embodiment will be described with reference to FIG. 10. FIG. 10 is a chart showing results of measured response times of the liquid crystal display panel of the present embodiment, and, as comparison examples, a comparison panel 1 that differs from the liquid crystal display panel of the present embodiment only in that the pixel electrodes thereof only include solid electrodes, and a comparison panel 2 that differs from the liquid crystal display panel of the present embodiment in that the ratio of the minutely patterned electrode portions of the pixel electrodes differs from that of the present embodiment. The comparison panel 2 is a panel in which the minutely patterned portions take up 76% of the entire pixel electrode. As shown in FIG. 10, in the liquid crystal display panel of the present embodiment (present embodiment in FIG. 10), the response time is short compared to that of the comparison panels (Comparison Examples 1 and 2 in FIG. 10). Thus, it can be said that the response characteristics are improved.

Next, upon measuring the restoring period for the residual images during display switching and the restoring period for the pressure marks in the liquid crystal display panel of the present embodiment and the comparison panels 1 and 2, the same results as those of FIG. 5 were attained, and as shown in FIG. 11, it is clear that both the restoring period for the residual images during display switching and the restoring period for the pressure marks can be reduced.

Figure 12:
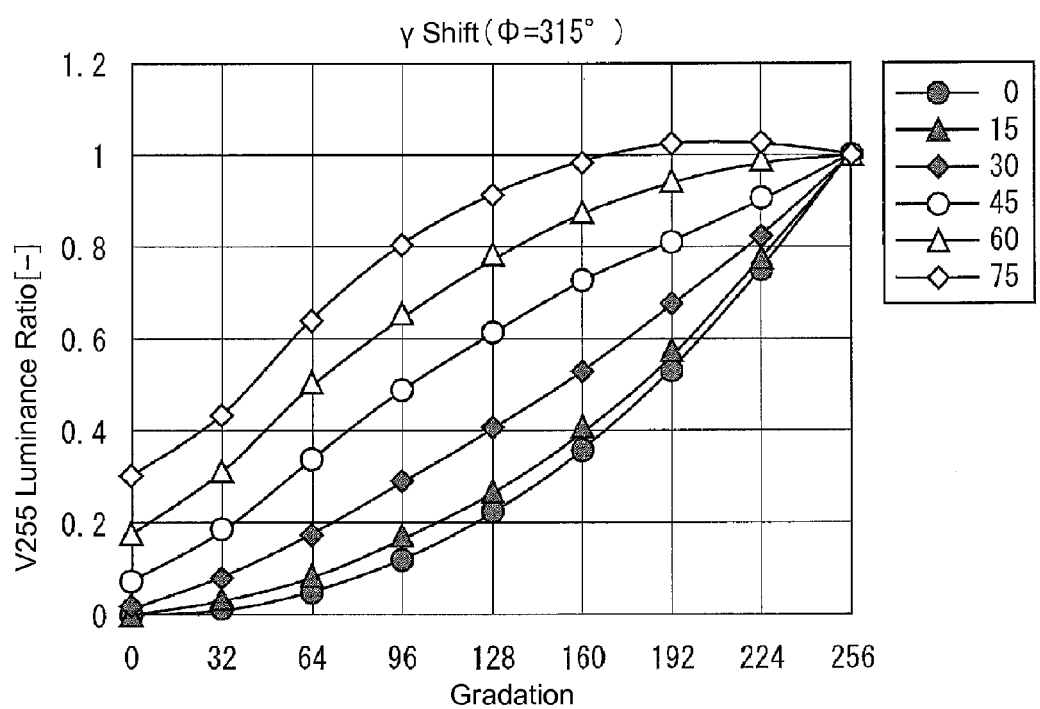
FIG. 12 shows characteristics of the liquid crystal display panel shown in FIG. 9.
Figure 13:
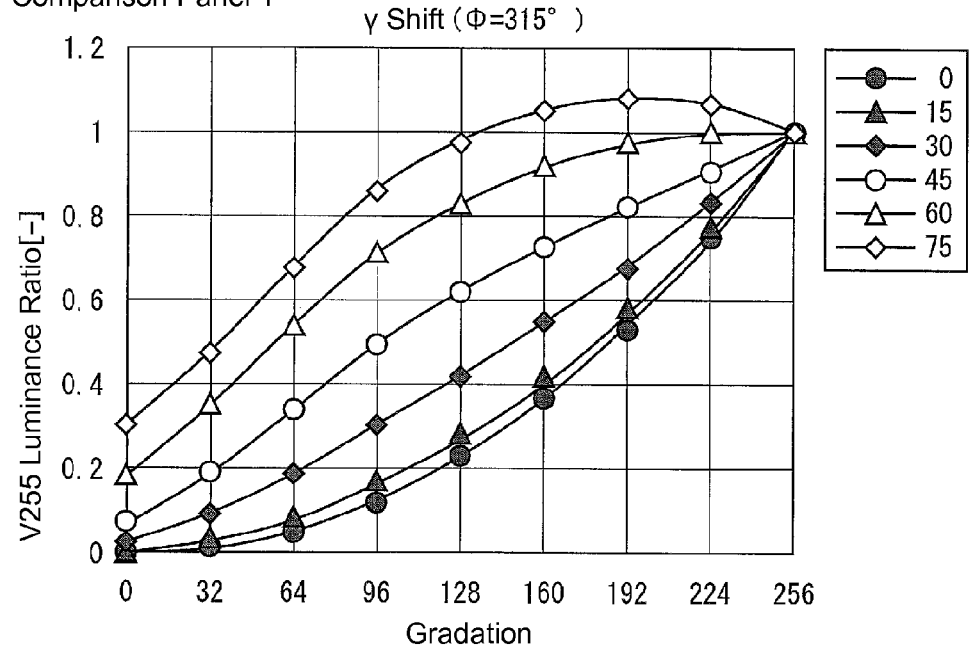
FIG. 13 shows characteristics of a liquid crystal display panel of comparison examples.
Figure 13:
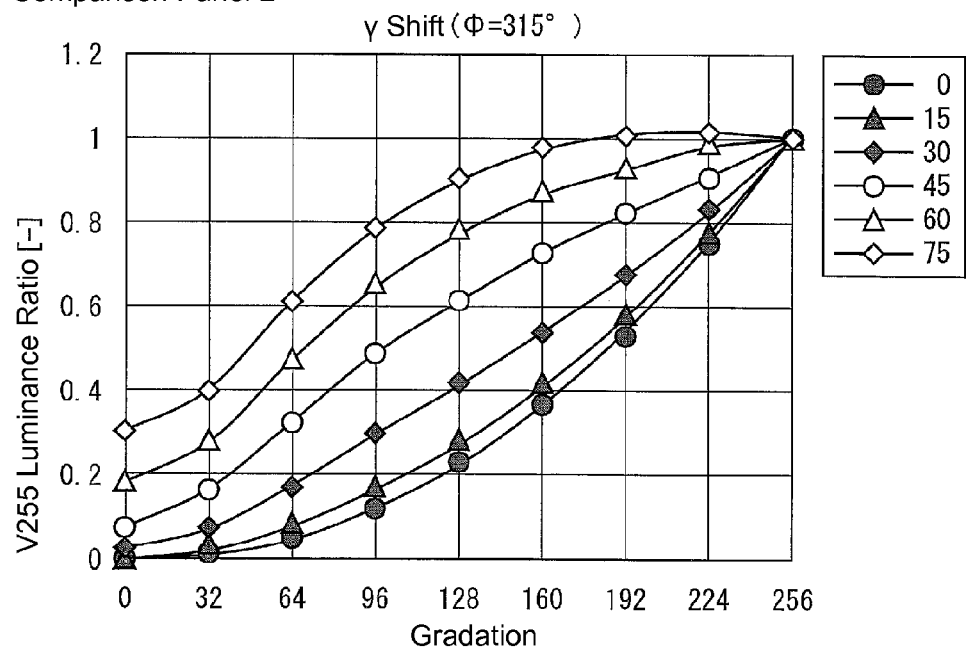

Next, alleviation of γ shift is described with reference to the liquid crystal display panel of the present embodiment and the comparison panels 1 and 2. FIG. 12 is a graph showing γ shift in the liquid crystal display panel of the present embodiment and FIG. 13 shows graphs of γ shift for the respective comparison panels 1 and 2. In the respective graphs, the azimuth Φ=315, and the viewing angle θ is 0 to 75°. In the example graphs, as θ increases, the gradation-luminance characteristic (luminance ratio) curve shifts upward with respect to the gradation-luminance characteristic curve for when θ=0. The greater the shift upward is, the greater the γ shift is, but in the liquid crystal display panel of the present embodiment, the amount of shift upward is small compared to the comparison panels 1 and 2 shown in FIG. 7. In other words, with the configuration of the liquid crystal display panel of the present embodiment, the amount of shift can be reduced.

Figures 14, 15:
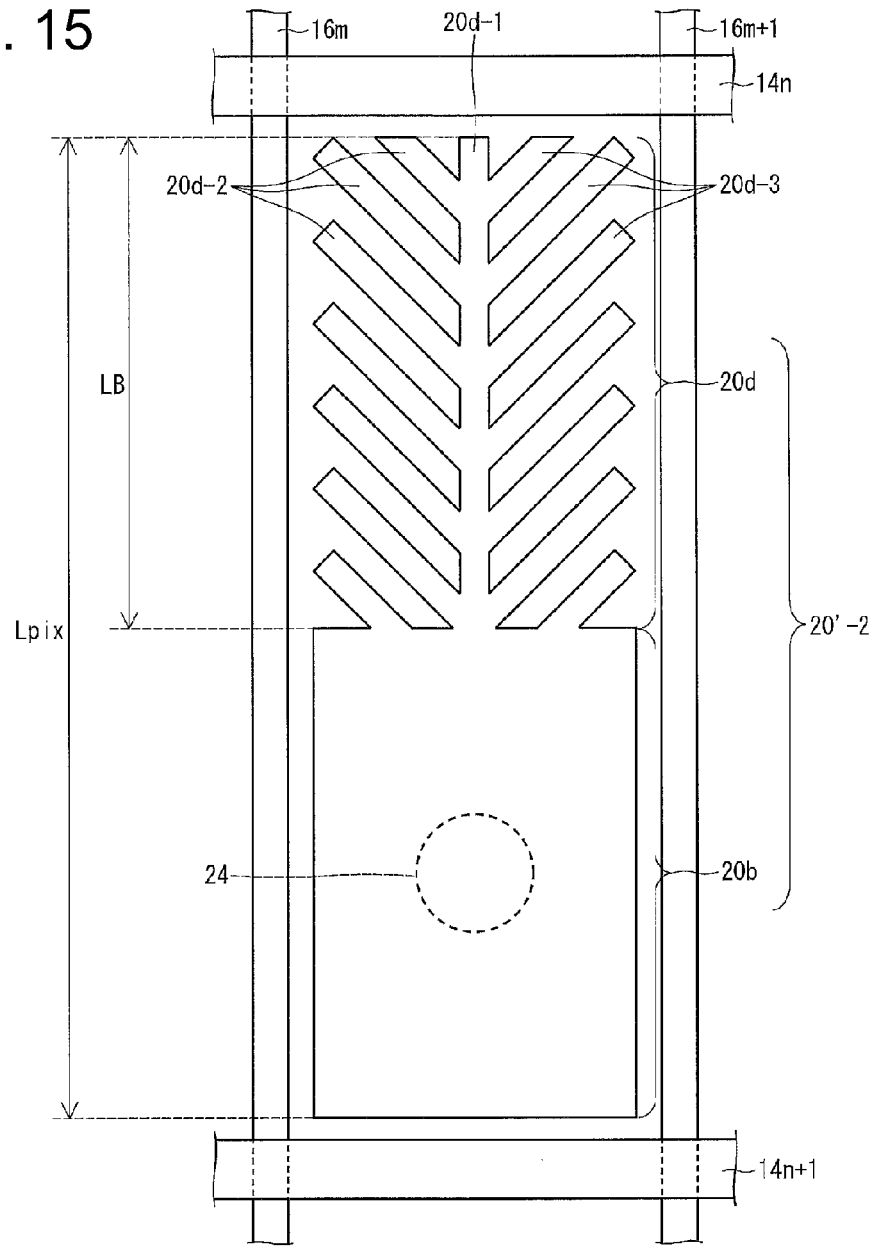
FIG. 14 shows a comparison between characteristics of the liquid crystal display panel shown in FIG. 9 and comparison examples.
FIG. 15 is a plan view of another embodiment of a pixel electrode included in the liquid crystal display panel shown in FIG. 1.

The transmittance of the liquid crystal display panel of the present embodiment and the comparison panels 1 and 2 is shown in FIG. 14. As shown in FIG. 14, the transmittance is improved compared to a configuration in which the entire pixel electrode is a solid electrode (comparison panel 1) and a configuration in which the proportion taken up by the minutely patterned electrode is outside of the above-mentioned range (ratio of comparison panel 2:minutely patterned electrode is 76%).

(Effects of the Present Embodiment)

According to the present embodiment, as in Embodiment 1, the total length of the minutely patterned electrode regions is 30% to 60% of the length of one pixel electrode in the direction parallel to the data wiring lines. In other words, the minutely patterned electrode regions take up at least 30% of the total length of the one pixel electrode in the direction parallel to the data wiring lines. As a result, it is possible to improve the response characteristics sufficiently, and it is possible to shorten the time required for the residual images to disappear during display switching, and the time required for pressure marks to disappear. On the other hand, as described above, if the proportion of the one pixel electrode taken up by the minutely patterned electrode regions is too large, then a decrease in transmittance is a concern. In the liquid crystal display panel of the present invention, the length of the minutely patterned electrode region in the direction parallel to the data wiring lines does not exceed 60% of the length of one pixel electrode. As a result, it is possible to mitigate a decrease in transmittance.

Embodiment 3

Another embodiment of the liquid crystal display panel of the present invention will be described with reference to FIG. 15. In the present embodiment, in order to describe differences with Embodiment 1, for ease of description, members having the same functions as the members described in Embodiment 1 are assigned the same reference characters, and descriptions thereof will be omitted.

The difference between Embodiment 1 and the present embodiment is in the structure of the pixel electrode. The structure of the pixel electrode of the present embodiment will be described with reference to FIG. 15. FIG. 15 is a drawing that corresponds to only the pixel electrode of FIG. 3 of Embodiment 1.

A pixel electrode 20'-2 included in a liquid crystal display panel of the present embodiment is constituted of one minutely patterned electrode region 20d and one solid electrode region 20b. The minutely patterned electrode region 20d and the solid electrode region 20b are both equal in length in the direction parallel to the two data wiring lines 16m and 16m+1. The structure (shape) of the minutely patterned electrode region 20d is the same as that of the first minutely patterned electrode region 20a of Embodiment 1.

In other words, the minutely patterned electrode region 20d is formed off of one side of the solid electrode region 20b, and has: (i) a trunk portion 20d-1 that is located substantially towards the center and that is parallel to the two data wiring lines 16m and 16m+1; (ii) a plurality of branch portions 20d-2 that are closer to one data wiring line 16m than the trunk portion 20d-1 and that extend towards the one data wiring line 16m; and (iii) a plurality of branch portions 20d-3 that are closer to one data wiring line 16m+1 than the trunk portion 20d-1 and that extend towards the one data wiring line 16m+1.

More specifically, the plurality of branch portions 20d-2 have a longer side direction that is inclined at approximately 45° in the counterclockwise direction on the page with the solid electrode region 20b as the center, with respect to the longer side direction of the trunk portion 20d-1, and the respective branch portions 20d-2 are parallel to each other and arranged at equal gaps therebetween. Some of the branch portions 20d-2 among the plurality of branch portions 20d-2 branch out from the trunk portion 20d-1, and the remaining branch portion 20d-2 branches out from the solid electrode region 20b.

More specifically, the plurality of branch portions 20d-3 have a longer side direction that is inclined at approximately 45° in the clockwise direction on the page with the solid electrode region 20b as the center, with respect to the longer side direction of the trunk portion 20d-1, and the respective branch portions 20d-3 are parallel to each other and arranged at equal gaps therebetween. Some of the branch portions 20d-3 among the plurality of branch portions 20d-3 branch out from the trunk portion 20d-1, and the remaining branch portion 20d-3 branches out from the solid electrode region 20b.

The minutely patterned electrode region 20d is formed off of a plurality of locations of the solid electrode region 20b. In other words, in FIG. 15, the trunk portion 20d-1 and the two branch portions (branch portions 20d-2, branch portions 20d-3) are formed off of the boundary between the solid electrode region 20b and the minutely patterned electrode region 20d.

The length Lpix of one pixel electrode 20'-2 in the direction parallel to the data wiring lines and the length LB of the minutely patterned electrode region 20d in the direction parallel to the data wiring lines satisfy the following relational formula: LB/Lpix=0.3 to 0.6.

Modification Example 1

In Modification Example 1, a minutely patterned electrode region 20d' differing in shape from the minutely patterned electrode region 20d described in the present embodiment will be described.

Figure 16:
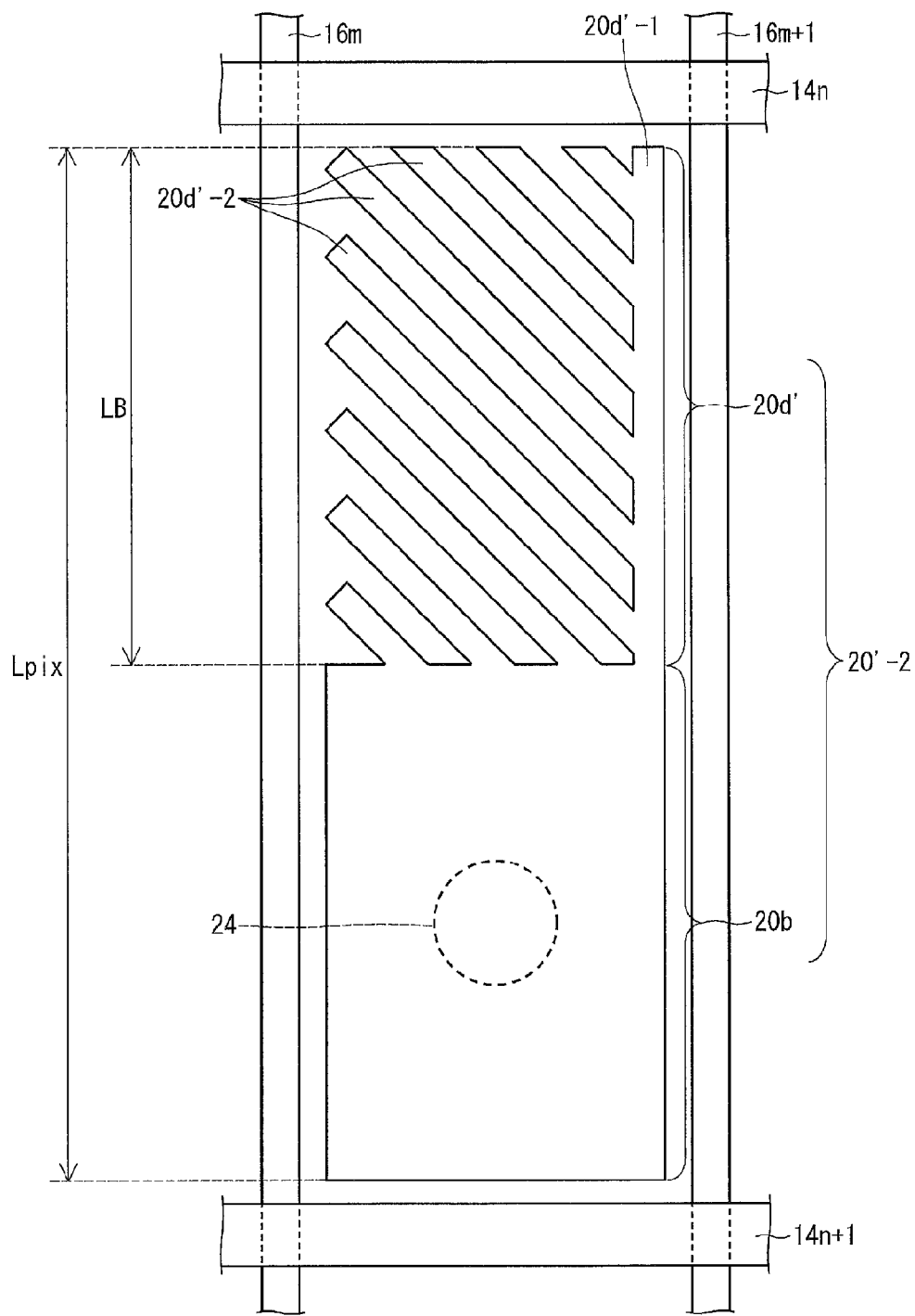
FIG. 16 is a plan view of another embodiment of a pixel electrode included in the liquid crystal display panel shown in FIG. 1.

A pixel electrode 20'-2 shown in FIG. 16 is a modification example of the pixel electrode 20'-2 shown in FIG. 15. In the minutely patterned electrode region 20d' of the pixel electrode 20'-2 of the present modification example, the trunk portion 20d-1 is in the position closest to the data wiring line 16m+1, and a plurality of branch portions 20d-2' are provided closer to the data wiring line 16m than the trunk portion 20d-1 and extend towards the data wiring line 16m.

Even with the minutely patterned electrode region 20d' having this shape, the length LB of the minutely patterned electrode region 20d' in the direction parallel to the data wiring lines and the length Lpix of the pixel electrode 20'-2 satisfies the following relation: LB/Lpix=0.3 to 0.6.

Modification Example 2

In Modification Example 2, a minutely patterned electrode region 20d''' differing in shape from the minutely patterned electrode region 20d described in the present embodiment will be described.

Figure 17:
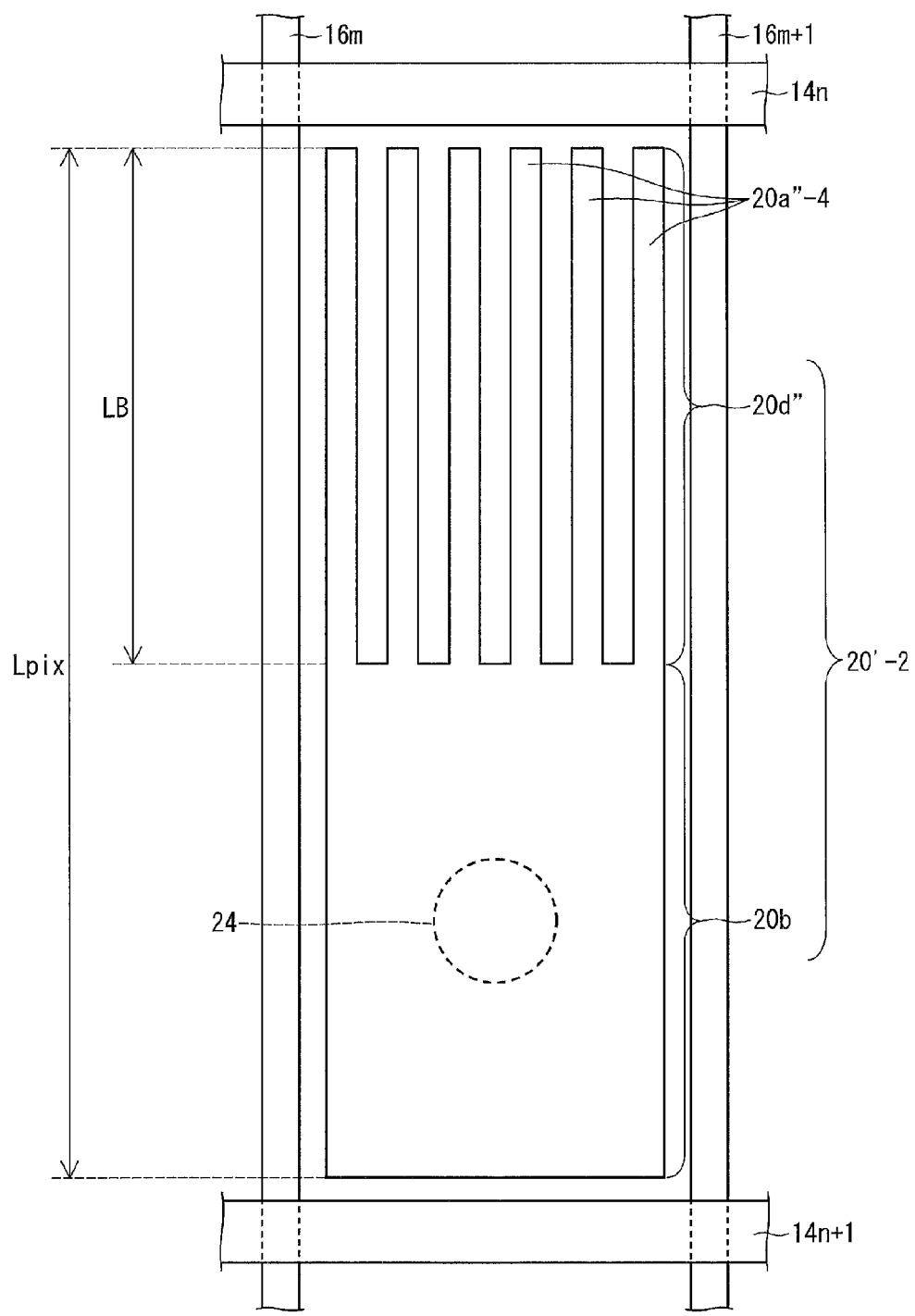
FIG. 17 is a plan view of another embodiment of a pixel electrode included in the liquid crystal display panel shown in FIG. 1.

A pixel electrode 20'-2 shown in FIG. 17 is a modification example of the pixel electrode 20'-2 shown in FIG. 15. The minutely patterned electrode region 20d''' of the pixel electrode 20'-2 of Modification Example 2 is constituted of a plurality of branch portions d'''-4 that extend from one surface of a generally rectangular solid electrode region 20b, in parallel with the data wiring lines.

Even with the minutely patterned electrode region 20d''' having this shape, the length LB of the minutely patterned electrode region 20d''' in the direction parallel to the data wiring lines and the length Lpix of the pixel electrode 20'-2 satisfies the following relation: LB/Lpix=0.3 to 0.6.

(Effects of the Present Embodiment)

According to the present embodiment, as in Embodiment 1, the total length of the minutely patterned electrode regions is 30% to 60% of the length of one pixel electrode in the direction parallel to the data wiring lines. In other words, the minutely patterned electrode regions take up at least 30% of the total length of the one pixel electrode in the direction parallel to the data wiring lines. As a result, it is possible to improve the response characteristics sufficiently, and it is possible to shorten the time required for the residual images to disappear during display switching, and the time required for pressure marks to disappear. On the other hand, as described above, if the proportion of the one pixel electrode taken up by the minutely patterned electrode regions is too large, then a decrease in transmittance is a concern. In the liquid crystal display panel of the present invention, the length of the minutely patterned electrode region in the direction parallel to the data wiring lines does not exceed 60% of the length of one pixel electrode. As a result, it is possible to mitigate a decrease in transmittance.

Embodiment 4

Figure 18:
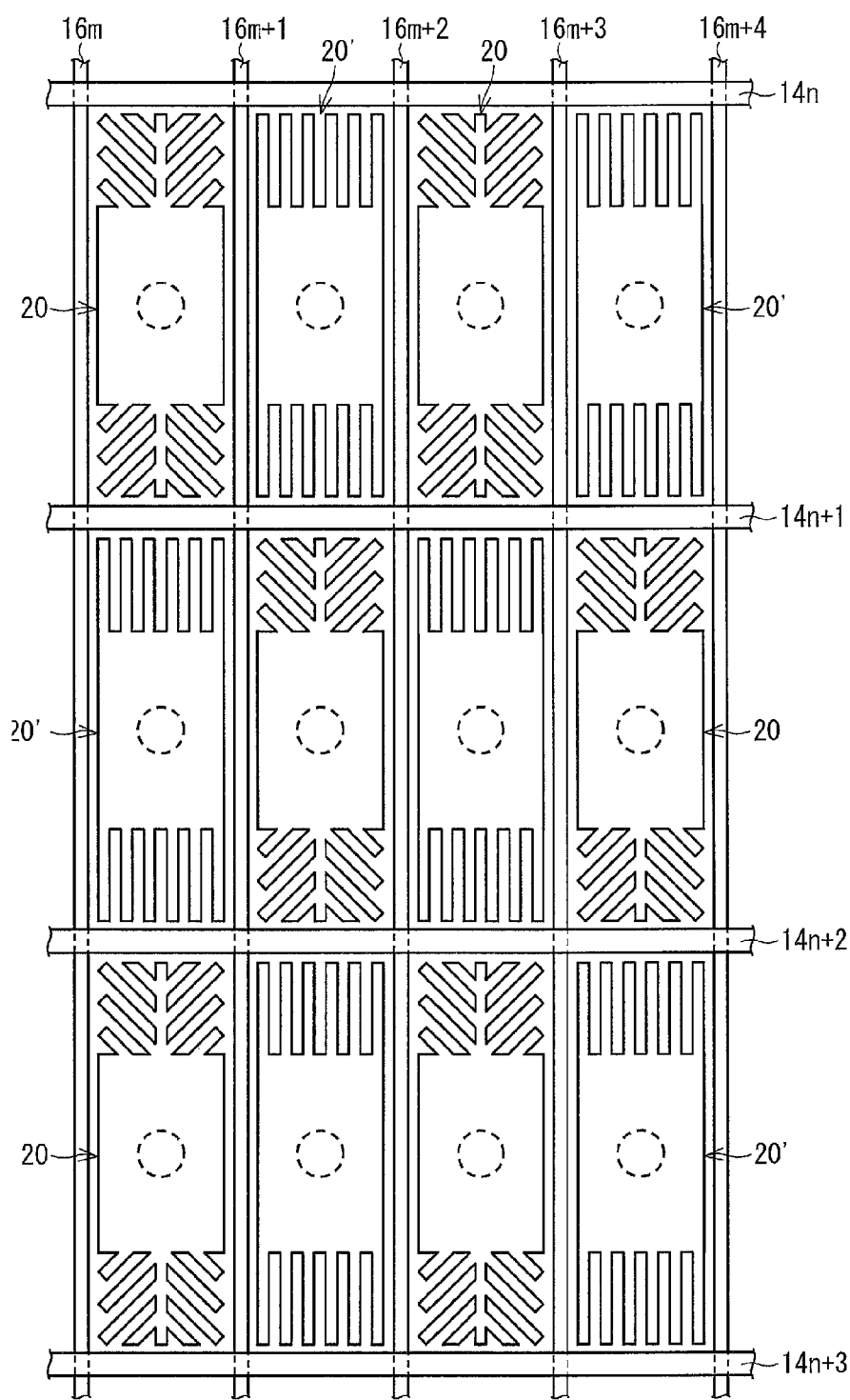
FIG. 18 is a plan view of another embodiment of a pixel electrode included in the liquid crystal display panel shown in FIG. 1.

Another embodiment of the liquid crystal display panel of the present invention will be described with reference to FIG. 18. In the present embodiment, in order to describe differences with Embodiment 1, for ease of description, members having the same functions as the members described in Embodiment 1 are assigned the same reference characters, and descriptions thereof will be omitted.

In the liquid crystal display panel of Embodiment 1 above, the pixel electrode 20 shown in FIG. 3 is provided in each pixel area. By contrast, as shown in FIG. 18, in a liquid crystal display panel of the present embodiment, the pixel electrode 20 of Embodiment 1 and the pixel electrode 20' of Embodiment 2 (FIG. 9) are disposed alternately along the scan wiring lines and alternately along the data wiring lines.

In this manner, pixel electrodes having minutely patterned electrode regions of different shapes are disposed alternately, thereby allowing an improvement in display quality from more azimuth directions.

Modification Example

Figure 19:
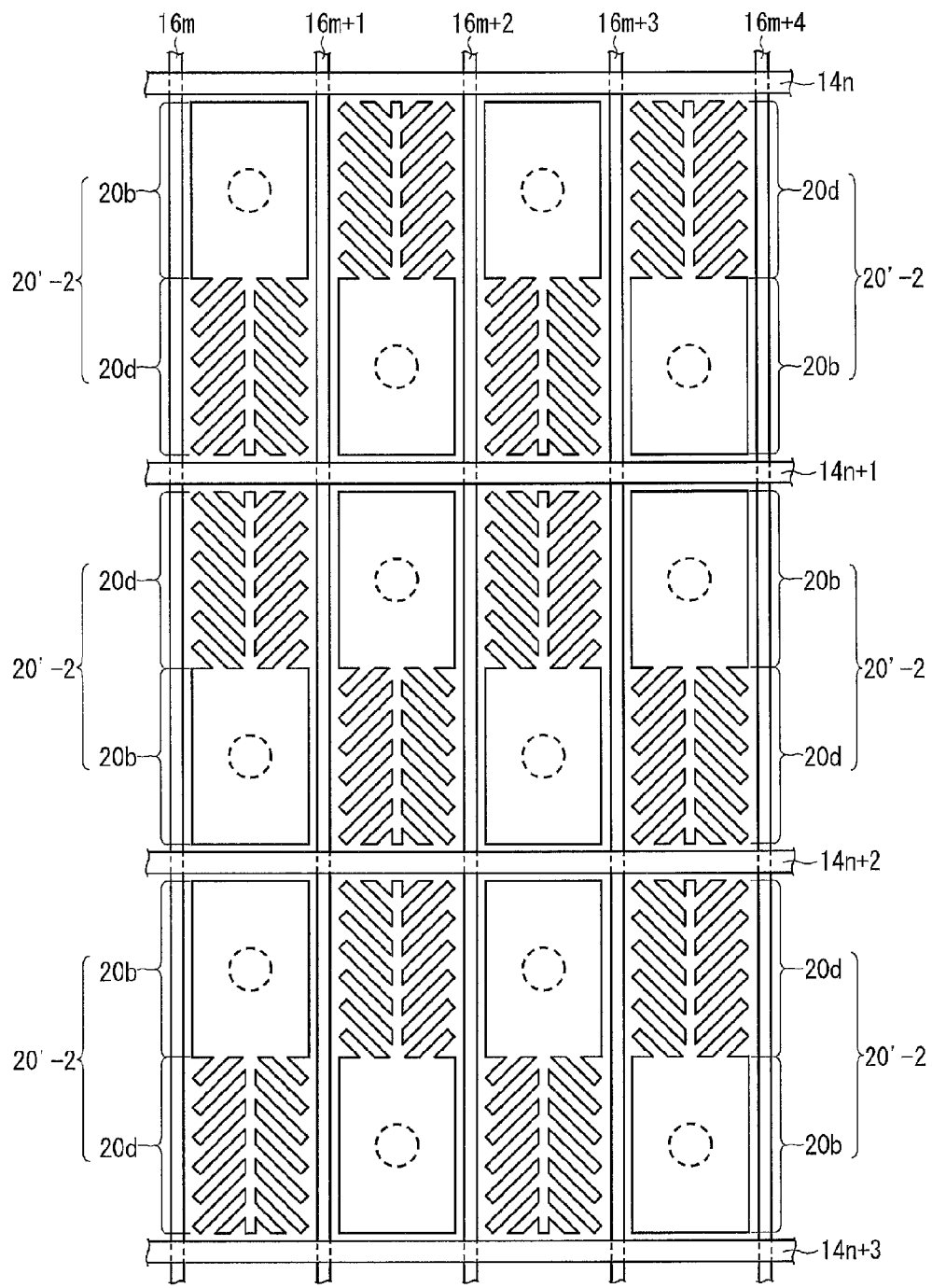
FIG. 19 is a plan view of another embodiment of a pixel electrode included in the liquid crystal display panel shown in FIG. 1.
Figure 20:
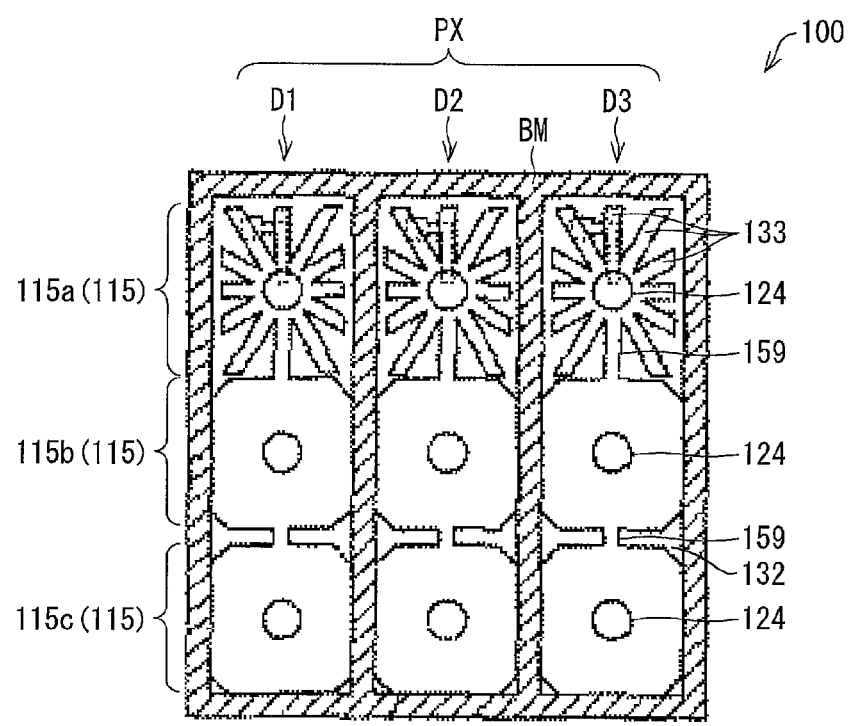
FIG. 20 is a diagram showing a conventional technology.
Figure 20:
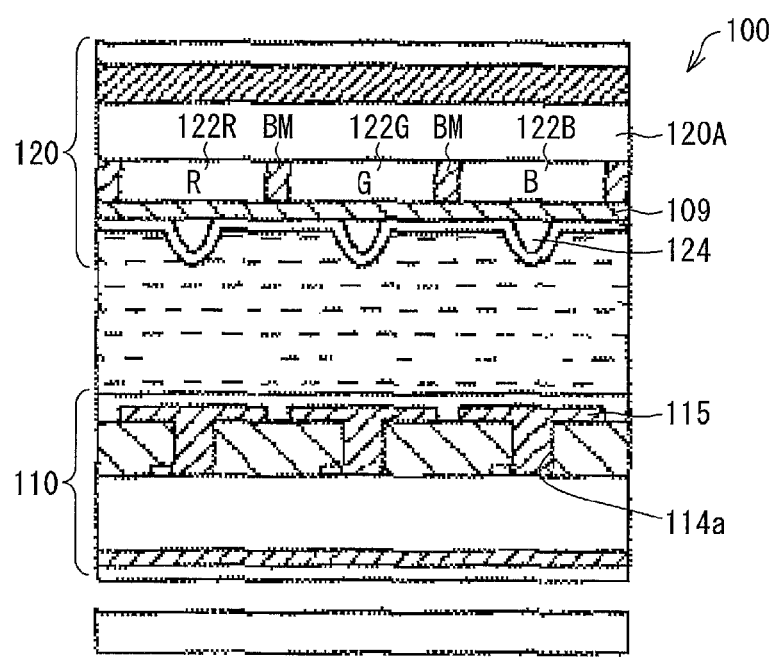
Figure 21:
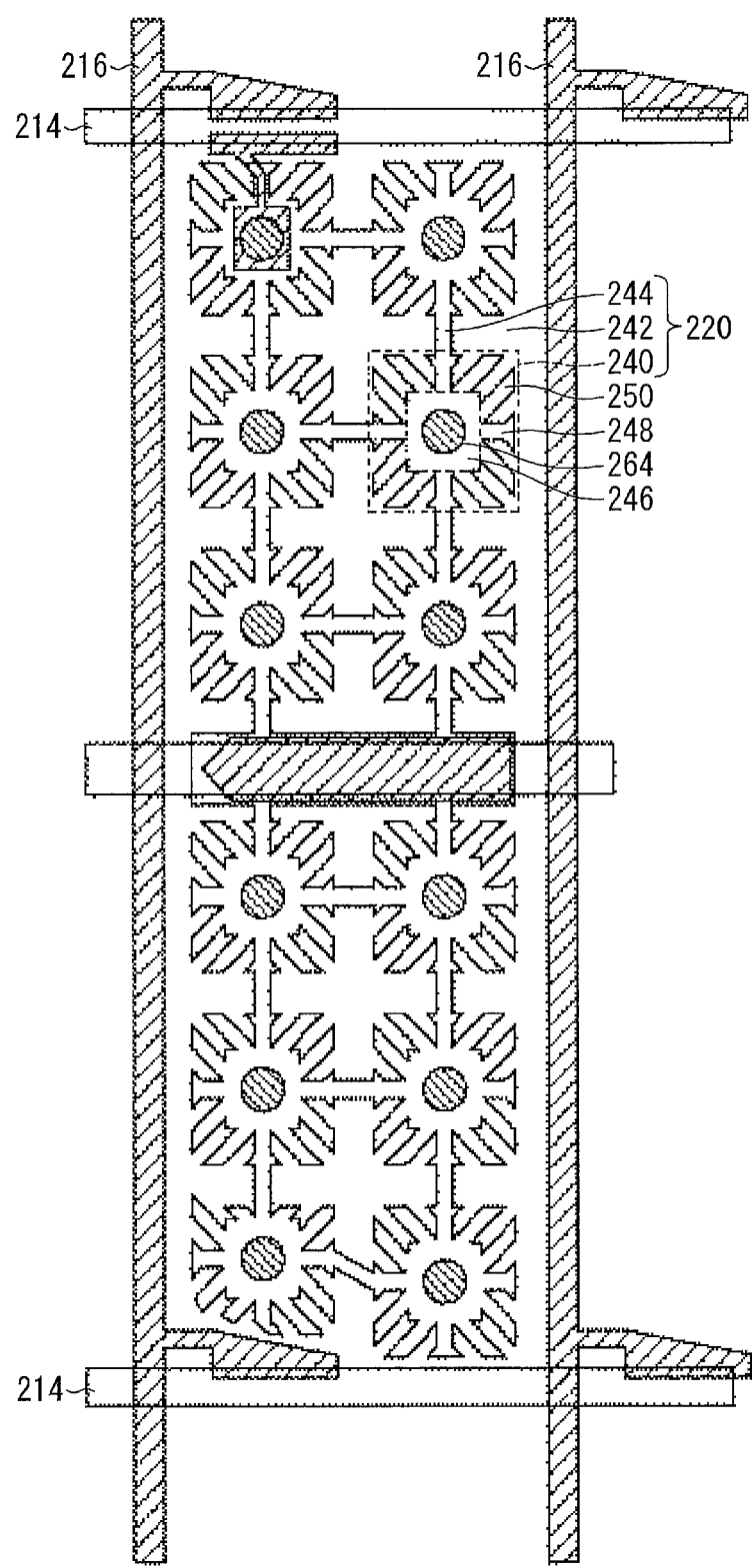
FIG. 21 is a diagram showing a conventional technology.

In the present embodiment, a case was described in which a plurality of types of pixel electrodes having minutely patterned electrode regions with different shapes are alternately disposed, but the present invention is not limited thereto, and in the modification example of FIG. 19, only the pixel electrodes 20'-2 shown in Embodiment 3 (FIG. 15) are used, the pixel electrodes 20'-2 being arranged such that along a certain scan wiring line, the minutely patterned electrode region 20d of a certain pixel electrode 20'-2 and the solid electrode region 20b of the adjacent pixel electrode 20'-2 are arranged alternately, and along a data wiring line, minutely patterned electrode regions 20d are adjacently arranged (that is, the solid electrode regions 20b are adjacent to each other).

Embodiments and modification examples of the present invention were described, but the present invention is not limited to the embodiments or the modification examples above. Various modifications are possible within the scope defined by the claims.

SUMMARY

A liquid crystal display panel of the present invention includes: an element substrate on which a plurality of data wiring lines and a plurality of scan wiring lines that are perpendicular to each other are provided, a switching element being provided at intersections therebetween, one pixel electrode be provided for each sub-pixel defined by adjacent two data wiring lines and adjacent two scan wiring lines perpendicular thereto; an opposite substrate that faces the element substrate; and a liquid crystal layer sandwiched between the element substrate and the opposite substrate, the one pixel electrode including one uniformly planar electrode region, and one or more finely patterned electrode regions adjacent to the one uniformly planar electrode region in a direction along the data wiring lines, the finely patterned electrode regions having a pattern finer than the uniformly planar electrode region, a portion that branches out from a plurality of locations of the one uniformly planar electrode region being provided in each of the one or more of the finely patterned electrode regions, a relational formula LB/Lpix=0.3 to 0.6 being satisfied, where Lpix is a length of the one pixel electrode in a direction parallel to the data wiring lines, and where LB is a total length of the one or more of the finely patterned electrode regions in the direction parallel to the data wiring lines.

According to the configuration above, it is possible to improve the display quality of a configuration in which the electrodes have a monodomain shape.

Specifically, one pixel electrode is constituted of one solid electrode region, and minutely patterned electrode regions adjacent to the solid electrode region along the data wiring lines. By providing this minutely patterned electrode region, it is possible to improve response characteristics, but as described above, if the proportion taken up in the one pixel electrode by the minutely patterned electrode region is too small, then the response characteristics cannot be improved sufficiently, and the time required for residual images to disappear during display switching, and the time required for pressure marks to disappear become long. In the liquid crystal display panel of the present invention, the length Lpix of one pixel electrode in the direction parallel to the data wiring lines and the length Lb of the minutely patterned electrode region in the direction parallel to the data wiring lines satisfy the following relational formula: LB/Lpix=0.3 to 0.6. In other words, the minutely patterned electrode regions take up at least 30% of the total length of the one pixel electrode in the direction parallel to the data wiring lines. As a result, it is possible to improve the response characteristics sufficiently, and it is possible to shorten the time required for the residual images to disappear during display switching, and the time required for pressure marks to disappear.

On the other hand, as described above, if the proportion of the one pixel electrode taken up by the minutely patterned electrode regions is too large, then a decrease in transmittance is a concern. In the liquid crystal display panel of the present invention, the length of the minutely patterned electrode region in the direction parallel to the data wiring lines does not exceed 60% of the length of one pixel electrode. As a result, it is possible to mitigate a decrease in transmittance.

Also, according to the configuration above, in the liquid crystal display panel of the present invention, the minutely patterned electrode region has portions that branch out from a plurality of locations from one solid electrode region. This means, in other words, that one pixel electrode is constituted of a plurality of electrode units. In other words, there is no slit provided between the solid electrode region and the minutely patterned electrode region, and the configuration is not one in which the two regions are connected by a connecting portion. Thus, compared to a conventional configuration in which a large slit reduces the aperture ratio, it is possible to mitigate a decrease in aperture ratio.

In addition to the configuration above, in one example of the liquid crystal display panel of the present invention, it is preferable that the one or more of the finely patterned electrode regions include, in the one pixel electrode, a first finely patterned electrode region located proximal to one of the two scan wiring lines that define the sub-pixel where the one pixel electrode is provided, and a second finely patterned electrode region provided proximal to another of the two scan wiring lines, that the one uniformly planar electrode region be interposed between the first finely patterned electrode region and the second finely patterned electrode region, and that the LB be a length calculated by adding a length L1 of the first finely patterned electrode region in the direction parallel to the data wiring lines to a length L2 of the second finely patterned electrode region in the direction parallel to the data wiring lines.

In some cases, the potential changes in the pixel electrode due to changes in potential in the scan wiring line, but the minutely patterned electrode region is less susceptible to effects from the scan wiring line than the solid electrode region. Thus, according to the configuration above, the minutely patterned electrode regions are respectively arranged towards one scan wiring line and another scan wiring line, and thus, it is possible to improve orientation control of the liquid crystal by minutely patterned electrodes, thereby alleviating the above-mentioned effects.

In addition to the configuration above, in one example of the liquid crystal display panel of the present invention, the length L1 of the first finely patterned electrode region in the direction parallel to the data wiring lines can be made equal to the length L2 of the second finely patterned electrode region in the direction parallel to the data wiring lines.

In addition to the configuration above, in one example of the liquid crystal display panel of the present invention, it is preferable that the opposite substrate be provided with an opposite electrode, and that the opposite electrode be provided with one hole for orientation control in a position facing the one uniformly planar electrode region, the one hole not being provided in a position facing the one or more of the finely patterned electrode regions.

According to the configuration above, one hole for orientation control is provided in the opposite electrode in a position corresponding to the one solid electrode region. As a result, it is possible to control the orientation of liquid crystal molecules in the liquid crystal layer at the solid electrode region, and thus, it is possible to widen the viewing angle.

On the other hand, in this configuration, the holes are not provided in positions corresponding to the minutely patterned electrode regions. As a result, it is possible to mitigate a decrease in aperture ratio.

In addition to the configuration above, in one example of the liquid crystal display panel of the present invention, it is preferable that the opposite substrate be provided with one orientation control structure in a position facing the one uniformly planar electrode region, the orientation control structure not being provided in a position facing the one or more of the finely patterned electrode regions.

According to this configuration, one of the orientation control structures is provided in a position corresponding to the one solid electrode region. As a result, it is possible to control the orientation of liquid crystal molecules in the liquid crystal layer at the solid electrode region, and thus, it is possible to widen the viewing angle.

On the other hand, in this configuration, the orientation control structures are not provided in positions corresponding to the minutely patterned electrode regions. As a result, it is possible to mitigate a decrease in aperture ratio.

In addition to the configuration above, in one example of the liquid crystal display panel of the present invention, it is preferable that at least one of the first finely patterned electrode region and the second finely patterned electrode region have a trunk portion that extends in the direction along the data wiring lines, and a plurality of branch portions that extend at 45° with respect to the trunk portion, and that some of the plurality of branch portions extend from the one uniformly planar electrode region.

According to this configuration, it is possible to improve response characteristics while mitigating a decrease in aperture ratio.

Also, according to the configuration above, both the first minutely patterned electrode region and the second minutely patterned electrode region have a trunk portion that extends along the data wiring lines and a plurality of branch portions that extend at a 45° angle to the trunk portion, and thus, the orientation direction can be divided into a plurality of orientation directions, thereby alleviating $\gamma$ shift.

In addition to the configuration above, in one example of the liquid crystal display panel of the present invention, at least one of the first finely patterned electrode region and the second finely patterned electrode region may have a plurality of branch portions that extend in parallel with the data wiring lines from the one uniformly planar electrode region.

In addition to the configuration above, in one example of the liquid crystal display panel of the present invention, it is preferable that the adjacent sub-pixels be respectively provided with the pixel electrodes that have the finely patterned electrode regions having different shapes from each other.

According to the configuration above, it is possible to improve display quality from more azimuth directions.

INDUSTRIAL APPLICABILITY

The present invention can be applied to various devices having liquid crystal display panels.

DESCRIPTION OF REFERENCE CHARACTERS

10 TFT substrate (element substrate)
12 CF substrate (opposite substrate)

14 scan wiring line
16 data wiring line
18 TFT
20, 20', 20'-2 pixel electrode
20a, 20a' first minutely patterned electrode region
20a-1 trunk portion
20a-2 branch portion
20a-3 branch portion
20a'-4 branch portion
20b solid electrode region
20c, 20c' second minutely patterned electrode region
20c-1 trunk portion
20c-2 branch portion
20c-3 branch portion
20c'-4 branch portion
20d, 20d', 20d" minutely patterned electrode region
20d-1 trunk portion
20d-2, 20d-2' branch portion
20d-3 branch portion
20d"-4 branch portion
22 storage capacitance bus line
24 hole (orientation control structure)
24a scan wiring line driver circuit
24b data wiring line driver circuit
28 polarizing plate
30 backlight unit
32 polarizing plate
D1, D2, D3 pixel area

What is claimed is:

1. A liquid crystal display panel, comprising:
an element substrate on which a plurality of data wiring lines and a plurality of scan wiring lines that are perpendicular to the data wiring lines are provided, switching elements being provided at respective intersections between the data wiring lines and the scan wiring lines, one pixel electrode being provided in each sub-pixel defined by adjacent two data wiring lines and adjacent two scan wiring lines perpendicular thereto;
an opposite substrate that faces the element substrate; and
a liquid crystal layer sandwiched between the element substrate and the opposite substrate,
wherein the one pixel electrode includes one uniformly planar electrode region, and one or more finely patterned electrode regions adjacent to the one uniformly planar electrode region in a direction along the data wiring lines, the finely patterned electrode regions having a pattern finer than the uniformly planar electrode region,
wherein a portion that branches out from a plurality of locations of the one uniformly planar electrode region is provided in each of said one or more of the finely patterned electrode regions, and
wherein a relational formula LB/Lpix=0.3 to 0.6 is satisfied, where Lpix is a length of the one pixel electrode in a direction parallel to the data wiring lines, and where LB is a total length of said one or more of the finely patterned electrode regions in the direction parallel to the data wiring lines.

2. The liquid crystal display panel according to claim 1,
wherein said one or more of the finely patterned electrode regions include, in the one pixel electrode, a first finely patterned electrode region located proximal to one of the two scan wiring lines that define the sub-pixel where the one pixel electrode is provided, and a second finely patterned electrode region provided proximal to another of the two scan wiring lines, wherein the one uniformly planar electrode region is interposed between the first finely patterned electrode region and the second finely patterned electrode region, and
wherein said LB is a length calculated by adding a length L1 of the first finely patterned electrode region in the direction parallel to the data wiring lines to a length L2 of the second finely patterned electrode region in the direction parallel to the data wiring lines.

3. The liquid crystal display panel according to claim 2, wherein the length L1 of the first finely patterned electrode region in the direction parallel to the data wiring lines is equal to the length L2 of the second finely patterned electrode region in the direction parallel to the data wiring lines.

4. The liquid crystal display panel according to claim 1,
wherein the opposite substrate is provided with an opposite electrode, and
wherein the opposite electrode is provided with one hole for orientation control in a position facing the one uniformly planar electrode region, the one hole not being provided in a position facing said one or more of the finely patterned electrode regions.

5. The liquid crystal display panel according to claim 1, wherein the opposite substrate is provided with one orientation control structure in a position facing the one uniformly planar electrode region, the orientation control structure not being provided in a position facing said one or more of the finely patterned electrode regions.

6. The liquid crystal display panel according to claim 2,
wherein at least one of the first finely patterned electrode region and the second finely patterned electrode region has a trunk portion that extends in the direction along the data wiring lines, and a plurality of branch portions that extend at 45° with respect to the trunk portion, and
wherein some of the plurality of branch portions extend from the one uniformly planar electrode region.

7. The liquid crystal display panel according to claim 2, wherein at least one of the first finely patterned electrode region and the second finely patterned electrode region has a plurality of branch portions that extend in parallel with the data wiring lines from the one uniformly planar electrode region.

8. The liquid crystal display panel according to claim 1, wherein adjacent said sub-pixels are respectively provided with said pixel electrodes that have said finely patterned electrode regions having different shapes from each other.

* * * * *